(12) United States Patent
Kaga et al.

(10) Patent No.: US 10,578,887 B2
(45) Date of Patent: *Mar. 3, 2020

(54) PAIR OF SPECTACLE LENSES FOR BINOCULAR VISION, MANUFACTURING METHOD, SUPPLY SYSTEM AND SUPPLY PROGRAM THEREOF

(71) Applicants: Tadashi Kaga, Tokyo (JP); Ayumu Ito, Tokyo (JP); Kazuma Kozu, Tokyo (JP)

(72) Inventors: Tadashi Kaga, Tokyo (JP); Ayumu Ito, Tokyo (JP); Kazuma Kozu, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

This patent is subject to a terminal disclaimer.

(21) Appl. No.: 15/539,716

(22) PCT Filed: Dec. 28, 2015

(86) PCT No.: PCT/JP2015/086467
§ 371 (c)(1),
(2) Date: Jun. 26, 2017

(87) PCT Pub. No.: WO2016/104809
PCT Pub. Date: Jun. 30, 2016

(65) Prior Publication Data
US 2017/0371181 A1    Dec. 28, 2017

(30) Foreign Application Priority Data
Dec. 26, 2014 (JP) .................. 2014-266556

(51) Int. Cl.
*G02C 7/06* (2006.01)
*G02C 7/02* (2006.01)
(Continued)

(52) U.S. Cl.
CPC ............. *G02C 7/066* (2013.01); *G02B 23/12* (2013.01); *G02C 7/02* (2013.01); *G02C 7/024* (2013.01);
(Continued)

(58) Field of Classification Search
CPC ........ G02C 7/024; G02C 7/061; G02C 7/066; G02C 7/086; G02C 7/088; G02C 7/063; G02B 23/12; G02B 27/0101
See application file for complete search history.

(56) References Cited

U.S. PATENT DOCUMENTS 6,019,470 A    2/2000  Mukaiyama et al.
6,129,435 A    10/2000 Reichow et al.
(Continued)

FOREIGN PATENT DOCUMENTS

CN   101151570 A    3/2008
JP   H11-295670 A   10/1999
(Continued)

OTHER PUBLICATIONS

Jun. 27, 2017 English Translation of International Preliminary Report on Patentability issued in Patent Application No. PCT/JP2015/086467.
(Continued)

*Primary Examiner* — Jordan M Schwartz
(74) *Attorney, Agent, or Firm* — Oliff PLC

(57) ABSTRACT

A pair of spectacle lenses for binocular vision. In each of the pair of spectacle lenses for binocular vision, when an inner horizontal direction of each of the spectacle lenses is a direction toward the nose of a user who wears the spectacle lenses, and an outer horizontal direction of each of the spectacle lenses is a direction toward an ear of the user, a portion for viewing an object at finite distance is provided and a shape of a base out prism is formed in the position such
(Continued)

that a line of sight of a user viewing an object through the portion is directed to a direction that is different from a direction from the object.

22 Claims, 34 Drawing Sheets

(51) Int. Cl.
    *G02C 7/14*     (2006.01)
    *G02B 23/12*     (2006.01)

(52) U.S. Cl.
    CPC ............... *G02C 7/06* (2013.01); *G02C 7/061* (2013.01); *G02C 7/063* (2013.01); *G02C 7/065* (2013.01); *G02C 7/14* (2013.01)

(56) References Cited

U.S. PATENT DOCUMENTS

| | | |
|---|---|---|
| 2003/0169397 A1 | 9/2003 | Reichow et al. |
| 2006/0070863 A1 | 4/2006 | Yeh et al. |
| 2006/0139571 A1 | 6/2006 | Poulain et al. |
| 2008/0137033 A1* | 6/2008 | Padula ..................... G02C 7/14 351/159.58 |
| 2009/0222122 A1 | 9/2009 | Daimaru et al. |
| 2010/0245762 A1* | 9/2010 | Krall ..................... G02C 7/061 351/159.42 |
| 2012/0062838 A1* | 3/2012 | Gottlieb .................. G02C 7/14 351/159.77 |
| 2012/0229755 A1 | 9/2012 | Kato et al. |
| 2012/0229756 A1 | 9/2012 | Kato et al. |
| 2015/0036102 A1* | 2/2015 | Ghosh ..................... G02C 7/14 351/205 |
| 2015/0049301 A1* | 2/2015 | Krall ..................... G02C 7/065 351/159.42 |

FOREIGN PATENT DOCUMENTS

| | | |
|---|---|---|
| JP | 2002-511594 A | 4/2002 |
| JP | 3852116 B2 | 11/2006 |
| JP | 2007-327984 A | 12/2007 |
| JP | 2009-086568 A | 4/2009 |
| JP | 2012-185448 A | 9/2012 |
| JP | 2012-185449 A | 9/2012 |
| WO | 2007/077848 A1 | 7/2007 |
| WO | 2010/111113 A1 | 9/2010 |

OTHER PUBLICATIONS

Mar. 8, 2016 International Search Report issued in Patent Application No. PCT/JP2015/086467.

Aug. 1, 2018 Extended Search Report issued in European Patent Application No. 15873377.4.

\* cited by examiner

EXAMPLE 6

(a) SURFACE POWER IN HORIZONTAL DIRECTION
(b) SURFACE POWER IN VERTICAL DIRECTION

HORIZONTAL LINE, WHICH IS PARALLEL WITH LINE PASSING THROUGH TWO ENGRAVING MARKS, AND WHICH PASSES THROUGH POINT 3 mm LOWER IN VERTICAL DIRECTION FROM MID-POINT OF LINE SEGMENT CONNECTING DISTANCE POWER MEASUREMENT POINT AND NEAR POWER MEASUREMENT POINT

PAIR OF SPECTACLE LENSES FOR BINOCULAR VISION, MANUFACTURING METHOD, SUPPLY SYSTEM AND SUPPLY PROGRAM THEREOF

TECHNICAL FIELD

The present invention relates to a pair of spectacle lenses for binocular vision, a manufacturing method, a supply system, and a supply program thereof.

BACKGROUND ART

Nowadays, various spectacle lenses for vision correction are known. For example, several examples can be put forward, such as a single vision lens in which one region for seeing an area at a predetermined distance is formed, a single vision lens in which power changes as view departs from the region, and a progressive power lens (a progressive multifocal lens in this description) which includes a portion (so-called progressive portion), where power changes continuously with respect to these two lenses.

For example, a progressive power lens according to PTL 1 includes: a distance portion which has distance power for distance vision; a near portion which has near power for near vision; and a progressive portion which exists between the distance portion and the near portion. In the spectacle lenses according to PTL 1, the distance portion and the near portion each have a respective prism of which power is different from each other. A prism is provided as a prescription to correct visual symptoms of a user, such as strabismus, heterophoria and fixation disparity. Hereafter this prism is called a "prescription prism". In paragraph [0004] of PTL 1, it is mentioned that double vision and poor depth perception may be experienced if the prisms of both eyes are incorrectly prescribed. An object of PTL 1 is to provide correctly prescribed prisms to progressive multifocal lenses, so that binocular vision can be comfortably exhibited in both the distance vision and near vision (paragraph [0005] in PTL 1).

Besides the above content, an element allowing the user to see an object clearly is the magnification by the spectacle lens (hereafter merely called "magnification"). Magnification by the spectacle lens refers to the state of an object directly in front of the user' eyes that appears larger or smaller depending on the power of the spectacle lens. It is natural for the user wearing the spectacle lens to see an object at actual size. Therefore conventionally it is thought that the magnification by the spectacle lens is close to 1.

In the case of the progressive power lens according to PTL 1, a progressive portion, in which the power continuously changes, exists between the distance portion and the near portion. Therefore in a singular spectacle lens, the above mentioned problem of magnification is generated. This is mentioned in PTL 2 to PTL 4, for example.

PTL 2 mentions that the difference of the magnification in the distance portion and the magnification in the near portion causes fluctuation and distortion when the spectacle lens is worn. For this, PTL 2 discloses a technology to constitute the progressive surface on the eyeball side surface (so-called inner surface).

The technology according to PTL 3 is a technology for a double-sided progressive lens, of which the surfaces on the object side (so-called outer surface) and on the inner surface are both progressive surfaces, and according to this technology, curvature of the near portion on the outer surface in the horizontal direction is increased, so that the magnification difference between the vertical direction and the horizontal direction of the near portion is decreased, thereby the generation of distortion is controlled.

The technology according to PTL 4 is also a technology for a double-sided progressive lens, and according to this technology, the curvature of the near portion on the outer surface in the horizontal direction is decreased, so that the magnification difference between the distance portion and the near portion is decreased, while decreasing the magnification difference between the vertical direction and the horizontal direction of the near portion, thereby the generation of distortion is controlled.

CITATION LIST

Patent Literature

[PTL 1] Japanese Patent Application Laid-open No. H11-295670
[PTL 2] Japanese Patent No. 3852116
[PTL 3] Japanese Patent Application Laid-open No. 2012-185448
[PTL 4] Japanese Patent Application Laid-open No. 2012-185449

SUMMARY OF INVENTION

Technical Problem

The present inventors performed earnest research on magnification. In this research, initially the above mentioned progressive power lens was closely studied.

A problem of the magnification difference in the progressive power lens is, for example, that fluctuation and distortion are generated due to the difference of power between the distance portion and the near portion. According to PTL 2, the magnification SM by a lens is normally expressed by the following equation.

$$SM = Mp * Ms \qquad \text{(Equation 1)}$$

Here Mp is a power factor, and Ms is a shape factor, which are expressed as follows as in FIG. 1 when L is a distance from the vertex of the eyeball side surface (inner vertex) of the lens to the eyeball, Po is the power at the inner vertex (inner vertex power), t is the thickness of the lens center, n is the refractive index of the lens, and Pb is a base curve (power) of the object side surface of the lens.

$$Mp = 1/(1 - L*Po) \qquad \text{(Equation 2)}$$

$$Ms = 1/\{1 - (t*Pb)/n\} \qquad \text{(Equation 3)}$$

As the units to calculate (Equation 2) and (Equation 3), dioptre (D) is used for the inner vertex power Po and the base curve Pb, and meter (m) is used for the distance L and the thickness t.

In other words, the value of Mp*Ms should be similar in the distance portion and in the near portion, in order to decrease the difference between SM of the distance portion and SM of the near portion. Po, L, t and n can barely be changed. This means that an appropriate Pb must be set for the distance portion and the near portion, in order to make the value of Mp*Ms similar in the distance portion and in the near portion.

However, even if an attempt is made to reduce the magnification difference by appropriately setting Pb, many problems occur when the spectacle lens is actually fabricated, according to the research of the inventors.

One problem lies in the spectacle frame into which the spectacle frame is fitted. Even if Pb is set mainly for reducing the magnification difference, this does not mean that the spectacle lens is fitted into the spectacle frame selected by the user while maintaining aesthetic appearances. In some cases, a spectacle lens, which protrudes from the spectacle frame, may be fabricated.

Another problem is that the setting of Pb is restricted by the power of the spectacle lens which was ordered. For example, in order to fabricate a lens having a −10.00 D prescription value (minus power) under the condition where the curve of the outer surface is 8.00 D (Pb=8.00 D), the curve of the inner surface must become 18.00 D, which is extremely deep and makes such fabrication impossible.

Still another problem is that even if Pb is appropriately set, the influence of Pb on the magnification is less than expected. For example, even if Pb is changed from 0 D to 10 D, when n=1.5 and t=0.002, Ms changes only from 1.000 to 1.014 (that is, about 1.4%). This is the same even when t=0.004, and in this case, Ms changes only from 1.000 to 1.027 (that is, about 2.7%).

As a result of the above research, the present inventors discovered that an attempt to reduce the magnification difference between the distance portion and the near portion by changing the curve itself of the spectacle lens is not very effective.

The present inventors also earnestly studied the magnification of lenses other than the progressive power lens. As a result, the present inventors discovered that, in the case of a single vision lens, there is a following unseen problem, in addition to the problem that an object looks larger or smaller than its actual size. In other words, when a user wears a new single vision lens which replaces a previous single vision lens, an object looks larger. According to the research by the present inventors, in most cases a user replaces the spectacle lens with a new one because a spectacle lens having a stronger power is required. Then the magnification by the new spectacle lens naturally increases. As a result, the difference from the magnification by the previous spectacle lens increases, which causes discomfort for the user.

A summary of the above content follows. In the case of a progressive power lens, a problem of the magnification difference within the single lens exists, and this problem cannot be handled simply by changing the curve. In the case of other lenses (e.g. single vision lenses), the magnification difference from the previous spectacle lens becomes a problem when a user purchases a new spectacle lens.

An object of the present invention is to provide a technology to reduce the discomfort caused by magnification when a user wears a spectacle lens.

Solution to Problem

To solve the above mentioned problem, the present inventors performed earnest examination. As a result, the inventors discovered a common factor in which a user experiences discomfort due to an object looking larger, whether the spectacle lens is a progressive power lens or not. A solution to this common factor is providing a means of making an object look smaller when the user sees an object. However, a means to magnify an image is the only available solution, such as a magnifier (loupe), and no attachment or spectacle lens to reduce the image for this purpose is known.

After earnest examination based on this discovery, the inventors conceived of a method to solve this problem not by one spectacle lens, but by a pair of spectacle lenses for binocular vision.

In concrete terms, a base out prism is disposed in each of the pair of spectacle lenses for binocular vision, independent from the prescription prism. Thereby parallax is intentionally generated between both eyes when the line of sight passes through each spectacle lens. Then the following method is also conceived: fusing each object image which entered through each eye (or "fusion"), which is a process performed in the brain of the user in the case of binocular vision, an image of an object is demagnified, and the demagnified image is perceived by the user.

This method of intentionally generating parallax is a technical concept that is completely the opposite of "allowing the user to see an object clearly", which is a selling point of conventional spectacle lenses (particularly progressive power lenses), as mentioned above. "Demagnifying an object and allowing the user to visually perceive the magnified object" is a concept conforming to the laws of nature and a technical idea, which will be described later.

Based on this information, the present invention has following aspects.

In a first aspect of the invention, a pair of spectacle lenses for binocular vision is provided, and in each of the pair of spectacle lenses for binocular vision, when an inner horizontal direction of each of the spectacle lenses is a direction toward the nose of a user who wears the spectacle lenses, and an outer horizontal direction of each of the spectacle lenses is a direction toward an ear of the user, a portion for viewing an object at a finite distance is provided, and a shape of a base out prism is formed in the portion such that a line of sight of the user viewing the object through the portion is directed to a direction that is different from a direction from the object.

In a second aspect of the invention according to the first aspect, the portion for viewing the object at a finite distance is a near portion.

In a third aspect of the invention according to the first or second aspect, each of the spectacle lenses includes a portion in which power changes continuously.

In a fourth aspect of the invention according to the third aspect, when the upper direction of each of the spectacle lenses is a direction of top of the spectacle lens and the lower direction of each of the spectacle lenses is a direction of bottom of the spectacle lens while the user wears the spectacle lens, the base out prism is disposed in a part that is lower than a specific distance power measurement point, a prism power measurement point, or a fitting point in the spectacle lens.

In a fifth aspect of the invention according to the third or fourth aspect, when the upper direction of each of the spectacle lenses is a direction of top of the spectacle lens and the lower direction of each of the spectacle lenses is a direction of bottom of the spectacle lens while the user wears the spectacle lens, each of the spectacle lenses includes a portion for viewing an object at a specific distance, a near portion for viewing an object at a distance nearer than the specific distance, and a progressive portion which is between the portion and the near portion and in which the power changes,
the spectacle lenses satisfying the following equation:

$$P_N - P_F > ADD * h/10$$

where $P_F$ denotes an amount of prism ($\Delta$) at a power measurement point of the portion for viewing an object at a specific distance, and $P_N$ denotes an amount of prism ($\Delta$) at a near power measurement point, and the amount of prism indicates a positive value in a case of a base out prism and a negative value in a case of a base in prism.

Further, ADD denotes an addition power (D), and h denotes an amount of inset (mm) in the spectacle lens, in which a positive direction is toward the nose and a negative direction is toward the ear, when viewed from a vertical line connecting an upper vertex and a lower vertex of the spectacle lens.

In a sixth aspect of the invention according to the fifth aspect, each of the spectacle lenses satisfies the following equation:

$$|P_N - P_f - ADD * h/10| \geq 0.25.$$

In a seventh aspect of the invention according to any one of the third to sixth aspects, when the upper direction of each of the spectacle lenses is a direction of top of the spectacle lens, and the lower direction of each of the spectacle lenses is a direction of bottom of the spectacle lens while the user wears the spectacle lens, at least a part of the portion of the spectacle lens includes a shape of continuously twisting at least one of shapes of an object side surface and an eyeball side surface of the spectacle lens in a horizontal cross-sectional view of the portion, in a lower direction of the spectacle lens, so that the amount of the base out prism increases in the lower direction.

In a eighth aspect of the invention according to the seventh aspect, an absolute value of a difference between surface power values in the vertical direction in positions ±15 mm from a point, through which a main line of sight passes, is 0.25 D or more, on a line which is parallel with a line passing through two engraving marks of the spectacle lens and which passes through any point on a line segment connecting a specific distance power measurement point and a near power measurement point.

In a ninth aspect of the invention according to the eighth aspect, any point on the line segment connecting the specific distance power measurement point and the near power measurement point is located in a ±3 mm range in a perpendicular direction from a mid-point as reference between the specific distance power measurement point and the near power measurement point.

In a tenth aspect of the invention according to the seventh aspect, an absolute value of a difference between surface power values in the horizontal direction in positions the ±5 mm from a point, through which main line of sight passes, is 0.12 D or more, on a line which is parallel with a line passing through two engraving marks of the spectacle lens and which passes through any point on a line segment connecting a specific distance power measurement point and a near power measurement point.

In an eleventh aspect of the invention according to the tenth aspect, any point on the line segment connecting the specific distance power measurement point and the near power measurement point is located in a ±3 mm range in a perpendicular direction from a mid-point as reference between the specific distance power measurement point and the near power measurement point.

In a twelfth aspect of the invention according to any one of the third to seventh aspects, the shape of the base out prism is also formed in parts in the outer horizontal direction and in the inner horizontal direction when viewed from the portion of the spectacle lens.

In a thirteenth aspect of the invention according to the twelfth aspect, when the upper direction of each of the spectacle lenses is a direction of top of the spectacle lens and the lower direction of each of the spectacle lenses is a direction of bottom of the spectacle lens while the user wears the spectacle lens, an absolute value of a difference between surface power values in the vertical direction in positions ±15 mm from a point, through which a main line of sight passes, is 0.25 D or more, on a line which is parallel with a line passing through two engraving marks of the spectacle lens and which passes through a point that is 3 mm higher in the vertical direction from a mid-point of a line segment connecting a specific distance power measurement point and a near power measurement point.

In a fourteenth aspect of the invention according to the twelfth aspect, an absolute value of a difference between surface power values in the vertical direction in positions ±15 mm from a point, through which a main line of sight passes, is 0.25 D or more, on a line which is parallel with a line passing through two engraving marks of the spectacle lens and which passes through a mid-point of a line segment connecting a specific distance power measurement point and a near power measurement point.

In a fifteenth aspect of the invention according to the twelfth aspect, when the upper direction of each of the spectacle lenses is a direction of top of the spectacle lens, and the lower direction of each of the spectacle lenses is a direction of bottom of the spectacle lens while the user wears the spectacle lens, an absolute value of a difference between surface power values in the vertical direction in positions ±15 mm from a point, through which a main line of sight passes, is 0.25 D or more, on a line which is parallel with a line passing through two engraving marks of the spectacle lens and which passes through a point that is 3 mm lower in the vertical direction from a mid-point of a line segment connecting a specific distance power measurement point and a near power measurement point.

In a sixteenth aspect of the invention according to any one of the third to seventh aspect, the amount of the base out prism is decreased in the outer horizontal direction and inner horizontal direction from the portion of the spectacle lens.

In a seventeenth aspect of the invention according to the sixteenth aspect, when the upper direction of each of the spectacle lenses is a direction of top of the spectacle lens, and the lower direction of each of the spectacle lenses is a direction of bottom of the spectacle lens while the user wears the spectacle lens, an absolute value of a difference between surface power values in the horizontal direction in positions ±5 mm from a point, through which a main line of sight passes, is 0.12 D or more, on a line which is parallel with a line passing through two engraving marks of the spectacle lens and which passes through a point that is 3 mm lower in the vertical direction from a mid-point of a line segment connecting a specific distance power measurement point and a near power measurement point.

In an eighteenth aspect of the invention according to the sixteenth aspect, an absolute value of a difference between surface power values in the horizontal direction in positions ±5 mm from a point, through which a main line of sight passes, is 0.12 D or more, on a line which is parallel with a line passes through two engraving marks of the spectacle lens and which passes through a mid-point of a line segment connecting a specific distance power measurement point and a near power measurement point.

In a nineteenth aspect of the invention according to the sixteenth aspect, when the upper direction of each of the spectacle lenses is a direction of top of the spectacle lens, and the lower direction of each of the spectacle lenses is a direction of bottom of the spectacle lens while the user wears the spectacle lens, an absolute value of a difference between surface power values in the horizontal direction in ±5 mm positions from a point, through which a main line of sight passes, is 0.12 D or more, on a line which is parallel with a line passing through two engraving marks of the spectacle lens and which passes through a point that is 3 mm higher in the vertical direction from a mid-point of a line segment connecting a specific distance power measurement point and a near power measurement point.

In a twentieth aspect of the invention according to any one of the third to nineteenth aspects, an amount of the base out prism is 2Δ or less.

In a twenty first aspect of the invention, a manufacturing method for a pair of spectacle lenses for binocular vision is provided, the method including: when an inner horizontal direction of each of the spectacle lenses is a direction toward the nose of a user who wears the spectacle lenses, and an outer horizontal direction of each of the spectacle lenses is a direction toward an ear of the user, a designing step of providing a portion for viewing an object at a finite distance to each of the pair of spectacle lenses for binocular vision, and forming a shape of a base out prism in the portion such that a line of sight of the user viewing the object through the portion is directed to a direction that is different from a direction from the object; and a manufacturing step of manufacturing the pair of spectacle lenses for binocular vision based on a result of the designing step.

In a twenty second aspect of the invention, a supply system of a pair of spectacle lenses for binocular vision is provided, the system including: when an inner horizontal direction of each of the spectacle lenses is a direction toward the nose of a user who wears the spectacle lenses, and an outer horizontal direction of the spectacle lenses is a direction toward an ear of the user, a receiving unit configured to receive information on the spectacle lenses; a designing unit configured to provide, based on the information on the spectacle lenses, a portion for viewing an object at a finite distance to each of the pair of spectacle lenses for binocular vision, and form a shape of a base out prism in the portion such that a line of sight of the user viewing the object is directed to a direction that is different from a direction from the object; and a transmitting unit configured to transmit design information that is acquired by the designing unit.

In a twenty third aspect of the invention, a supply program of a pair of spectacle lenses for binocular vision is provided, to cause a computer to perform functions for the following units: when an inner horizontal direction of each of the spectacle lenses is a direction toward the nose of a user who wears the spectacle lenses, and an outer horizontal direction of the spectacle lenses is a direction toward an ear of the user, a receiving unit configured to receive information on the spectacle lenses; a designing unit configured to provide, based on the information on the spectacle lenses, a portion for viewing an object at a finite distance to each of the pair of spectacle lenses for binocular vision, and form a shape of a base out prism in the portion such that a line of sight of the user viewing the object is directed to a direction that is different from a direction from the object; and a transmitting unit configured to transmit design information that is acquired by the designing unit.

Advantageous Effects of Invention

According to the present invention, a technology to reduce the discomfort caused by magnification when a user wears a spectacle lens can be provided.

BRIEF DESCRIPTION OF DRAWINGS

FIG. 1(a) depicts a state when a visual target is seen with both eyes in response to a convergence request, and fusion is performed by the brain, whereby the visual target is perceived as being smaller and nearer (so-called Small In: SI), and FIG. 1(b) depicts a state when a visual target is seen with both eyes responding to a divergence request, and fusion is performed by the brain, whereby the visual target is perceived as being larger and more distant (so-called Large Out: LO).

FIG. 9(a) is a distribution map of a surface astigmatism, FIG. 9(b) is a distribution maps of a surface mean power.

FIG. 16(a) is a distribution map of a surface astigmatism, FIG. 16(b) is a distribution map of a surface mean power.

FIG. 17(a) is a distribution map of a surface astigmatism, FIG. 17(b) is a distribution map of a surface mean power.

FIG. 18(a) is a distribution map of a surface astigmatism, FIG. 18(b) is a distribution map of a surface mean power.

FIG. 19(a) is a distribution map of a surface astigmatism, FIG. 19(b) is a distribution map of a surface mean power.

FIG. 20(a) is a distribution map of a surface astigmatism, FIG. 20(b) is a distribution map of a surface mean power.

FIG. 21(a) is a distribution map of a surface astigmatism, FIG. 21(b) is a distribution map of a surface mean power.

FIG. 22(a) is a distribution map of a surface power in the horizontal direction, and FIG. 22(b) is a distribution map of a surface power in the vertical direction.

FIG. 23(a) is a distribution map of a surface power in the horizontal direction, and FIG. 23(b) is a distribution map of a surface power in the vertical direction.

FIG. 24(a) is a distribution map of a surface power in the horizontal direction, and FIG. 24(b) is a distribution map of a surface power in the vertical direction.

FIG. 25(a) is a distribution map of a surface power in the horizontal direction, and FIG. 25(b) is a distribution map of a surface power in the vertical direction.

FIG. 26(a) is a distribution map of a surface power in the horizontal direction, and FIG. 26(b) is a distribution map of a surface power in the vertical direction.

FIG. 27(a) is a distribution map of a surface power in the horizontal direction, and FIG. 27(b) is a distribution map of a surface power in the vertical direction.

FIG. 28(a) is a distribution map of a surface power in the horizontal direction, and FIG. 28(b) is a distribution map of a surface power in the vertical direction.

DESCRIPTION OF EMBODIMENTS

Figure 1:
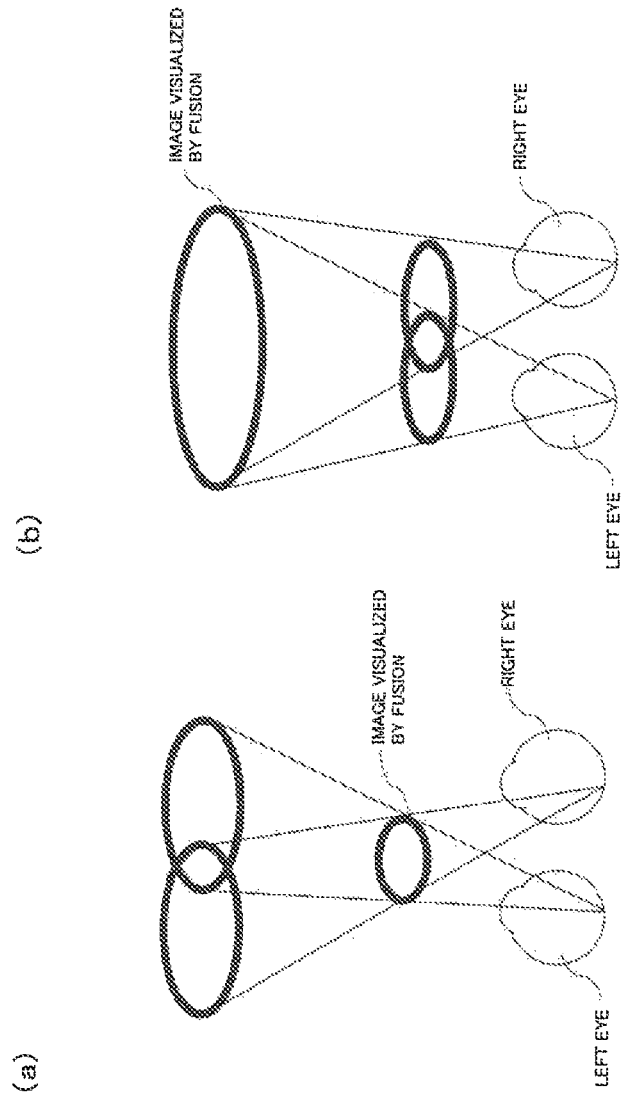
FIG. 1 are schematic plan views depicting the SILO phenomena, where

[Embodiment 1]
This embodiment is described in the following sequence.
1. Technical idea of this invention
   1-1. Technical background
   1-2. Estimation of magnification change
2. Pair of spectacle lenses for binocular vision
   2-1. Configuration of spectacle lens
   2-2. Difference from prior art
   2-3. Determination method In this description, it is assumed that the upper direction is a direction of top of the spectacle lens, and the lower direction is a direction of bottom of the spectacle lens. If a user moves their lines of sight from above to below through the spectacle lenses, the eyes converge inward.

Further, in this description, the inner horizontal direction is a direction toward the nose of the user, and the outer horizontal direction is a direction toward the ear of the user.

In this description, the horizontal direction is 0° or 180° in defining the astigmatic axis and the prism base direction, and an example when the horizontal direction matching the direction of the horizontal reference line connecting two alignment reference marks (so-called engraving marks) for fitting the lens into the frame is described. The horizontal reference line in this embodiment refers to the line that extends horizontally at a mid-point between the upper vertex and the lower vertex of the spectacle lens (lens before being fit into the frame).

<1. Technical Idea of this Invention>
(1-1. Technical Background)
The background of the technical idea of this invention is described.

A background of this invention involves researches on the biological visual characteristics of the human eyes. These visual characteristics include the SILO phenomena (see for example "Basic binocular vision", Koryu Shuppansha Co. Ltd, Shinji Seki, Revised, Apr. 1, 2009).

SILO is an acronym for Small In Large Out.

In the SILO phenomenon, when an individual sees a visual target with both eyes in response to a convergence request (i.e., by converging both eyes), fusion is performed by the brain, and the visual target is perceived as being smaller and nearer (so-called Small In: SI), as illustrated in FIG. 1(a).

On the other hand, when the individual sees a visual target with both eyes in response to a divergence request (i.e., without converging the eyes), fusion is performed by the brain, and the visual target is perceived as being larger and more distant (so-called Large Out: LO), as illustrated in FIG. 1(b).

The SILO phenomenon can be explained in geometric-optical terms as follows.

For example, FIG. 1(a) is an example in which SI is generated. In a case where the right eye can see the left visual target and the left eye can see the right visual target (i.e., case where parallax is generated as excessive convergence is generated in the lines of sight of both eyes), fusion is generated in a position where the lines of sight cross (i.e., position closer to the eyeballs than the visual target). Then as illustrated in FIG. 1(a), the visual target is perceived as smaller and nearer.

FIG. 1(b), on the other hand, is an example in which LO is generated. In a case where the right eye can see the right visual target and the left eye can see the left visual target (i.e., case where parallax is generated in a divergence state which does not cause convergence in the lines of sight of both eyes), fusion is generated in a position where the lines of sight cross (i.e., a position more distant from the visual target). Then as illustrated in FIG. 1(b), the visual target is perceived as larger and more distant.

Another document (Bunkyo University Faculty of Information and Communication: Information Research, No. 46, "Fusion type zoomable stereo-photo viewer", Tetsuo Hirouchi, January 2012) also discloses a technology of using parallax of both eyes on an image for the left eye and an image for the right eye, so that when the image is perceived by fusion, the user can perceive the image that looks more distant but still magnified.

As described above, the present inventors obtained knowledge that the SILO phenomenon is caused by fusion. Then the present inventors conceived of the possibility of applying this SILO phenomenon to spectral lenses, a first among those skilled in the art. Then the present inventors obtained new knowledge that the function of SI, as illustrated in FIG. 1(a), is implemented by providing a base out prism to each of a pair of spectacle lenses for binocular vision respectively.

In other words, in this embodiment, fusion in the brain is performed at an area where the line of sight of each eye crosses, as illustrated in FIG. 1(a). As a result, the virtual image generated by fusion is perceived at a distance closer to the user than the actual object, and is perceived smaller than the real image of the object.

The virtual image is perceived smaller than the real image in a case where the viewing angles do not change before and after the base out prisms are provided. In other words, unless various conditions, including the viewing angles, are changed before and after the user wears the spectacle lenses, the demagnified virtual image is perceived by the presence of the base out prisms, and the above mentioned effect of the present invention is exhibited.

(1-2. Estimation of Magnification Change)
Demagnification when the virtual image is demagnified compared with the real image by the pair of spectacle lenses for binocular vision including the base out prism, is described. The demagnification depends on the user, since convergence and the degree of cycloduction of each user, and fusion in the brain of the user, are related to the magnification. Here, however, the demagnification is described with reference to FIG. 2 using one exemplary model case in order to describe this embodiment as detailed as possible.

Figure 2:
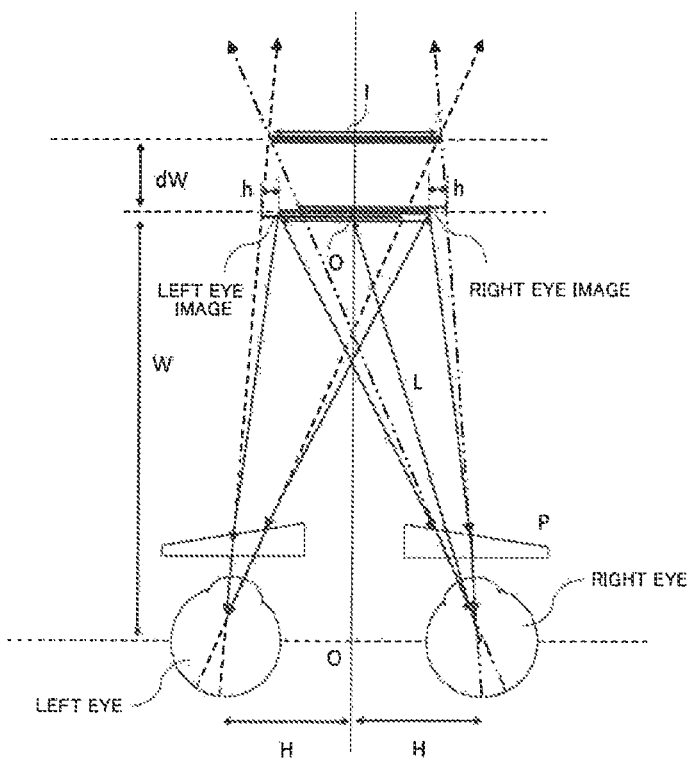
FIG. 2 is a diagram depicting β (demagnification), where each reference sign is added to each composing element in a schematic top view depicting: a position of an object perceived by a user via a base out prism (position of a virtual image); and the size of the object (size of the virtual image) when the object is positioned at the central front of both eyeballs of the user in a front view direction of the user.

FIG. 2 is not a diagram depicting the state of generating SI by providing the above mentioned base out prism, but a diagram depicting a state of generating LO by providing a base in prism. This diagram is used because it is more convenient to describe the state of generating LO. FIG. 2 is a diagram depicting the position of an object perceived by a user through a base in prism (i.e., position of a virtual image), and the size of the object (i.e., size of the virtual image) when the object is positioned at the central front of the eyeballs of the user in the front view direction, and in FIG. 2, each reference sign is added to each composing element.

The meaning of each reference sign follows.

I: size of virtual image in horizontal direction (mm)
O: size of real image (object) in horizontal direction (mm)
W: distance between center of eyeball and real image in front view direction of user (mm)
dW: distance between real image and virtual image in front view direction of user (mm)
H: half value of pupil distance (mm)
h: amount of deviation between virtual image and real image in horizontal direction (mm)
L: distance between center of eyeball and center portion of real image (mm)
P: amount of prism ($\Delta$)

Further, 1$\Delta$ means that light deviates 1 cm in the horizontal direction at 1 m ahead of the prism after light passes through the prism. With respect to following equations only, the amount of prism has a positive value in the case of the base in prism, and a negative value in the case of the base out prism. In this description, however, the sign may be omitted when a base in prism or base out prism is indicated. In this case, "the base out prism increases" means that the degree of the base out prism increases, and also means that "the absolute value of the amount of the base out prism increases".

h (amount of deviation) has a same sign as the later mentioned amount of inset, but the meaning of h is different from that of the amount of inset. Only with respect to (Equation 1) to (Equation 8), h is defined as the amount of deviation between the virtual image and the real image in the horizontal direction.

First in FIG. 2, the following equation is established.

$$I:O=W+dW:W \quad \text{(Equation 4)}$$

(Equation 4) is transformed into the following equation.

$$I/O=1+dW/W \quad \text{(Equation 5)}$$

If $\beta$ is a demagnification (=I/O), (Equation 5) becomes as follows.

$$\beta=1+dW/W \quad \text{(Equation 6)}$$

On the other hand, P can be derived as follows based on the Prentice's formula.

$$P = (h/10)[\text{cm}]/(L/1000)[\text{m}] \quad \text{(Equation 7)}$$
$$= 100*h/L$$

(Equation 7) is transformed to determine h as follows, assuming that L$\approx$W.

$$h=W*P/100 \quad \text{(Equation 8)}$$

H and h have the following relationship.

$$H:h=W+dW:dW \quad \text{(Equation 9)}$$

(Equation 9) is transformed as follows.

$$dW=W*h/(H-h) \quad \text{(Equation 10)}$$

The following equation can be derived from (Equation 6) and (Equation 10).

$$\beta=H/(H-h)=H/\{H-W*P/100\} \quad \text{(Equation 11)}$$

The demagnification can be estimated using (Equation 11), although this is an exemplary case.

For example, if H=32 mm, W=400 mm and P=−1$\Delta$, then $\beta$=0.89. This means that the user can visually perceive the object about 10% smaller by wearing this pair of spectacle lenses. (Equation 11) was derived using only geometric relationships, hence the image to be perceived by fusion cannot be fully explained by this equation, but at least the relationship on enlargement/reduction of an image can be explained.

The above description focuses on the technical idea of this invention. Now a pair of spectacle lenses, which is a specific example of this invention, is described.

<2. Pair of Spectacle Lenses for Binocular Vision>

An aspect of this embodiment is a pair of spectacle lenses for binocular vision. A pair of spectacle lenses are used because, as mentioned above, parallax is intentionally generated in both lines of sight, so that the user perceives a virtual image which is a demagnified image of an object by skillfully using the fusion generated by the binocular vision. Each spectacle lens is a lens constituted by an object side surface (outer surface) and an eyeball side surface (inner surface). With regard to a configuration of the lens, unless otherwise specified, a configuration of a publically known spectacle lens may be used.

The pair of spectacle lenses of this embodiment is not especially limited, as long as it is for vision correction. In other words, the pair of spectacle lenses may be a single vision lens in which one region to see an object at a predetermined distance is formed, a single vision lens in which power changes as the position in the lens departs from this region, a bi-focal lens in which a small lens is formed, or a progressive power lens which includes a portion where power changes continuously (so-called progressive portion) may be used.

The progressive power lens may be a progressive multifocal lens which includes a distance portion and a near portion, or a progressive multifocal lens which includes not the distance portion but an intermediate portion (e.g. portion to view an object from 400 cm to 40 cm), and a near portion (a so called "occupational lens"), or may be a progressive multifocal lens which includes a near portion and another near portion for viewing an object even closer (e.g. less than a 100 cm distance) (so called "near vision lens").

Each spectacle lens of this embodiment includes a portion for viewing an object at a finite distance. This is because, as described above, the above mentioned SILO phenomenon occurs based on the degree of convergence. In other words, in the case of a spectacle lens used only for distance vision, correlation between the lens and the SILO phenomenon becomes weaker, and the above mentioned demagnified vision effect of the virtual image may not be expected, hence each spectacle lens of this embodiment includes a portion for viewing an object at a finite distance.

The above mentioned spectacle lenses may have a shape reflecting an astigmatic power based on an astigmatic prescription, or may be spectacle lenses in which a prescription prism, to correct user' symptoms, such as heterotropia, heterophoria and fixation disparity, is disposed independently from the base out prism.

(2-1. Configuration of Spectacle Lens)

One major characteristic of this embodiment is that when the user sees an object via the portion for viewing an object at a finite distance, the shape of a base out prism formed in this portion directs the line of sight to a direction that is different from the object. In other words, this portion has the shape of the base out prism, which directs the ray along the line of sight to a direction that is different from this object.

The portion for viewing an object at a finite distance is preferably a near portion. This is because convergence is generated by near vision, and the virtual image can be demagnified and perceived with more certainty, as mentioned above. In the following, a case where this portion is the near portion is described as an example.

However, needless to say, this portion may be an intermediate portion instead of a near portion, or may be a near portion for viewing an object even closer.

In each spectacle lens including the base out prism, the shape of the portion for viewing an object at a finite distance is not especially limited. In other words, the base out prism may be formed by evenly inclining the entire shape of the outer surface. The base out prism may be formed by evenly inclining a part of the inner surface only for the near portion. Further, the base out prism may be added to the entire shape of the outer surface so that the amount of the prism changes continuously, or such a base out prism may be added to the near portion.

In the case of a single vision lens which includes a portion where power changes continuously, or a progressive power lens which includes a distance portion, a near portion and a progressive portion, there is a preferred mode to add a base out prism. This mode is described in [Embodiment 2].

The amount of the base out prism to be provided is not especially limited, as long as the virtual image is demagnified and perceived smaller than the real image in binocular vision.

Each of a pair of spectacle lenses for binocular vision may have a base out prism of which the amount of prism is different from the other, as long as a demagnified view is possible by fusion in the binocular vision. However, in terms of balance of both eyes in the binocular vision, it is preferable that each spectacle lens includes the shape of the base out prism, of which difference in the amount of the base out prism from the other spectacle lens is 0.25Δ or less (more preferably the same amount).

In the following, a case where the amount of the base out prism of each spectacle lens is the same is described. A single spectacle lens is primarily described in the present description, but unless otherwise specified, the content of the following description can be applied equally to the spectacle lens for the left eye and the spectacle lens for the right eye.

(2-2. Difference from Prior Art)

In PTL 1 and in any other document providing a prism in a spectacle lens, the purpose of providing the prism is to direct the line of sight to an object. Since the aim is to enable the user to clearly view the object, this is the main purpose of providing the prism regardless the types of spectacle lens, such as a single vision lens and a progressive power lens. At least, a spectacle lens, which includes a prism that is different from a prescription prism, to intentionally direct the line of sight to a direction different from the object, is still unknown.

In this embodiment, as mentioned above however, a base out prism is provided to each of the pair of spectacle lenses, and parallax is intentionally generated in the lines of sight of both eyes, so that the SILO phenomena is implemented in the spectacle lenses. Thereby the user can perceive a virtual image that is demagnified compared with the real image.

(2-3. Determination Method)

Whether the base out prism according to this embodiment is provided in a spectacle lens or not can be unequivocally determined. Without exception, a lens bag on which prescription values are written is always attached to the spectacle lens delivered to a user. The information on the prescription prism is also written on the lens bag. If this information is not written on the lens bag, the information is inscribed directly on the spectacle lens as marks.

If the prism in the spectacle lens is found as a base out prism after the amount of the prism is examined, and has a different value from the prescription prism s written on the lens bag, then the actual line of sight direction is different from the line of sight direction of the prescribed prism, thereby the technical idea of the present invention is reflected in this spectacle lens.

[Embodiment 2]

<3. Preferred Example of Shape of Base Out Prism>

In this embodiment, a preferred example of the shape of the base out prism is primarily described. Here redundant content of [Embodiment 1] is omitted.

This embodiment is described in the following sequence.

3-1. Handling of convergence in front vision 3-2. Handling of continuous base out prism The spectacle lens according to this embodiment is not especially limited, as long as the spectacle lens has a portion in which power changes continuously (progressive portion). For example, the spectacle lens of this embodiment may be a progressive multifocal lens which includes a distance portion for viewing a distant area (e.g. infinity to 400 cm), and a near portion for viewing a near area (e.g. 100 cm or less), or a single vision lens which includes plus power and of which power changes while moving away from one region for viewing an object at a predetermined distance. Needless to say, the spectacle lens of this embodiment may be an outer surface progressive lens having a progressive surface on the outer surface, an inner surface progressive lens having a progressive surface on the inner surface, or a double-sided progressive lens where a change in power is distributed on both surfaces.

In the following description, an inner surface progressive lens (outer surface is a spherical surface) as the progressive multifocal lens is described as an example.

(3-1. Handling of Convergence in Front Vision)

As mentioned above, the shape of the portion for viewing an object at a finite distance in each spectacle lens, which includes a base out prism, is not especially limited.

However, in the case of the progressive power lens, it is preferable to provide the above mentioned base out prism in a position lower than the distance power measurement point, the prism power measurement point, or the fitting point, rather than by adding a base out prism evenly. The base out prism of this embodiment is for certain a prism provided independently from a prescription prism. Unlike a conventional spectral lens, parallax is generated in the binocular vision because of this base out prism, as mentioned above.

The reason why the above example is preferable follows.

Figure 3:
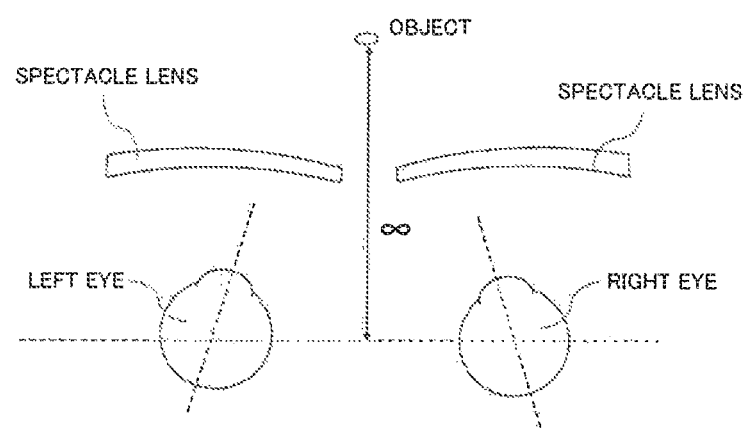
FIG. 3 is a schematic top view depicting a state when the user sees from a distance, where the lines of sight normally become parallel and natural if the spectacle lenses are not worn, but the base out prisms force the lines of sight of the user to converge excessively.

A case of evenly adding the base out prism to all the portions of the progressive power lens, which includes the distance portion, the near portion and the progressive portion, is considered as an example. In this case, when the user sees an object at a distance through the distance portion of the spectacle lens, as illustrated in FIG. 3, the lines of sight would naturally be parallel if the user were not wearing the spectacle lenses, but the lines of sight of the user are forced to excessively converge because of the presence of the added base out prism. In other words, in the above case, the above mentioned effect of perceiving the demagnified virtual image—in other words, an effect of this invention—can be surely exhibited when the user sees an object at a finite distance through the near portion or progressive portion. However, when the user sees the object through the distance portion, an unintentional convergence is generated, and an unnecessary fatigue may be experienced.

However, if the base out prism is disposed in a position lower than the distance power measurement point, the prism power measurement point or the fitting point, parallax is not generated in the binocular vision in the distance portion where the two lines of sight are parallel. As a result, the two lines of sight are naturally parallel when the user sees from a distance. On the other hand, when the user sees an object at a finite distance, a demagnified virtual image of the object can be perceived.

On the other hand, the shape of the surface of the spectacle lens, to which the base out prism is provided, must be considered. It is certainly possible that the base out prism is evenly provided to a part lower than the distance power measurement point, the prism power measurement point or the fitting point. However, if this method is used, a step difference is generated on the surface of the spectacle lens between the upper part and the lower part from the prism power measurement point or the fitting point. Because of this step difference, an image viewed by the user may appear to jump when the lines of sight move vertically, also the aesthetic appearance of the spectacle lens should be considered.

As a result, the following method is preferable.

(3-2. Addition of Continuous Base Out Prism)

As a preferred example to provide a base out prism to a part lower than the distance power measurement point, the prism power measurement point or the fitting point the shape of the spectacle lens is continuously twisted in the lower direction, so that the base out prism increases in the lower direction of the spectacle lens. At this time, the tangential line at a point on the main line of sight on the inner surface of the spectacle lens is set to be higher on the nose side and lower on the ear side in the horizontal cross-sectional view. This twisted shape is a shape considering that the base out prism is continuously increased without generating the step difference on the surface of the spectacle lens.

The above mentioned twisted shape may be provided to the entire part that is lower than the distance power measurement point, the prism power measurement point or the fitting point in the spectacle lens (corresponding to the later mentioned Examples 3 to 5). However, it is preferable to control: the base out prism in the portion where the main line of sight passes, and the sides thereof in the spectacle lens (corresponding to the later mentioned Examples 6 to 8).

Here, "the main line of sight" in this description is described briefly.

In a progressive multifocal lens, the main line of sight or the meridian (hereafter called "main line of sight"), which is a reference when the power changes continuously, is set.

The main line of sight in this description refers to a line formed by points where the line of sight passes through in the spectacle lens when the user, wearing the spectacle lens, moves the lines of sight from above to below. This main line of sight is the base when the spectacle lens is designed.

The goal of this embodiment is still "to implement a demagnification function using parallax in binocular vision, and thereby decrease the discomfort caused by magnification". In other words, the demagnification function can be sufficiently implemented if the main line of sight, for which convergence of the user has been considered, is not the vertical line (perpendicular line) connecting the upper vertex and the lower vertex of the spectacle lens, hence the shape of the main line of sight (regardless a straight line or curved line) is not limited. Since the shape of the main line of sight may be changed depending on the user, it is unnecessary to unequivocally define the shape and position of the main line of sight itself for a lens constituting the spectacle lens of this embodiment.

Figure 5:
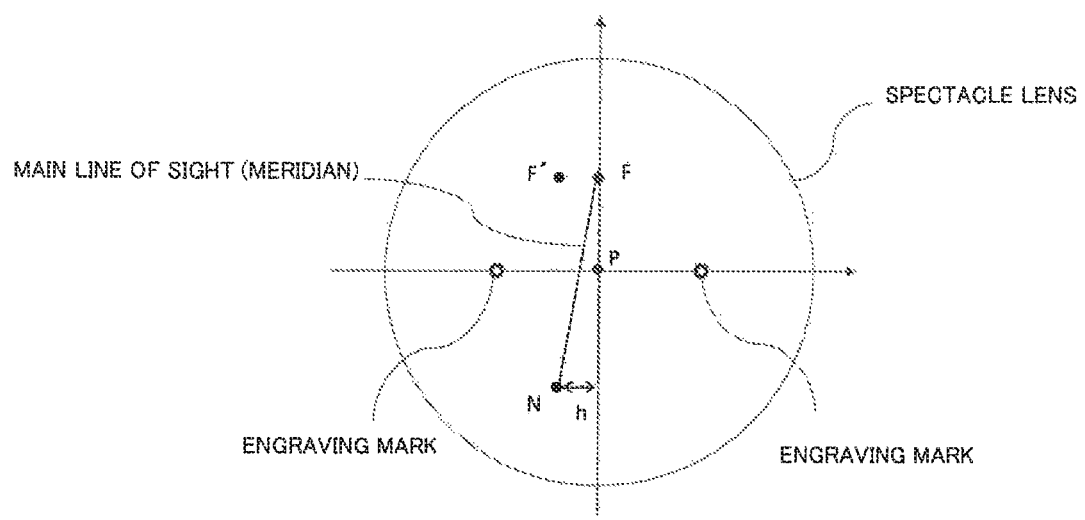
FIG. 5 is a schematic plan view of the spectacle lens according to this embodiment.

In this embodiment, to simplify description, the main line of sight in the progressive multifocal lens is defined as a line connecting the distance power measurement point and the near power measurement point (FIG. 5). This definition can also be used to specify the position of the main line of sight in an actual lens.

FIG. 5 is a schematic plan view of the spectacle lens according to this embodiment. The point F is the distance power measurement point, and the point N is the near power measurement point. h is the amount of inset (mm) in the spectacle lens, where the nose side is positive and the ear side is negative when viewed from the vertical line connecting the upper vertex and the lower vertex of the spectacle lens. Additionally, h is also a horizontal distance (mm) between the vertex of the horizontal sectional shape of the spectacle lens and a point on the main line of sight (e.g. point N in FIG. 5), i.e. a distance (mm) between the point F and the point N in the horizontal direction. The absolute value of h corresponds to the amount of inset in the spectacle lens. The vertex of the horizontal sectional shape is defined as a point where the plane, which is vertical to the line passing through the two engraving marks, and which includes the mid-point of the line segment connecting the two engraving marks, crosses with the horizontal sectional shape.

Figure 6:
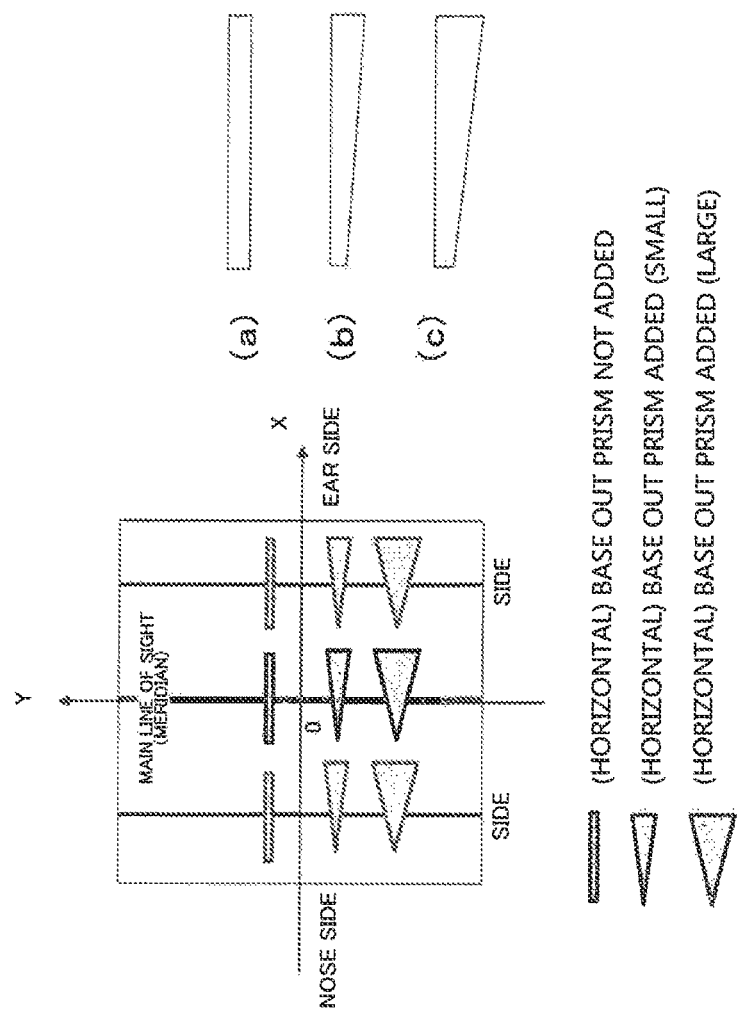
FIG. 6 is a conceptual diagram depicting the control state of the base out prisms in the portion α through which the main line of sight passes, and both sides thereof in the spectral lens according to Example 3.
Figure 7:
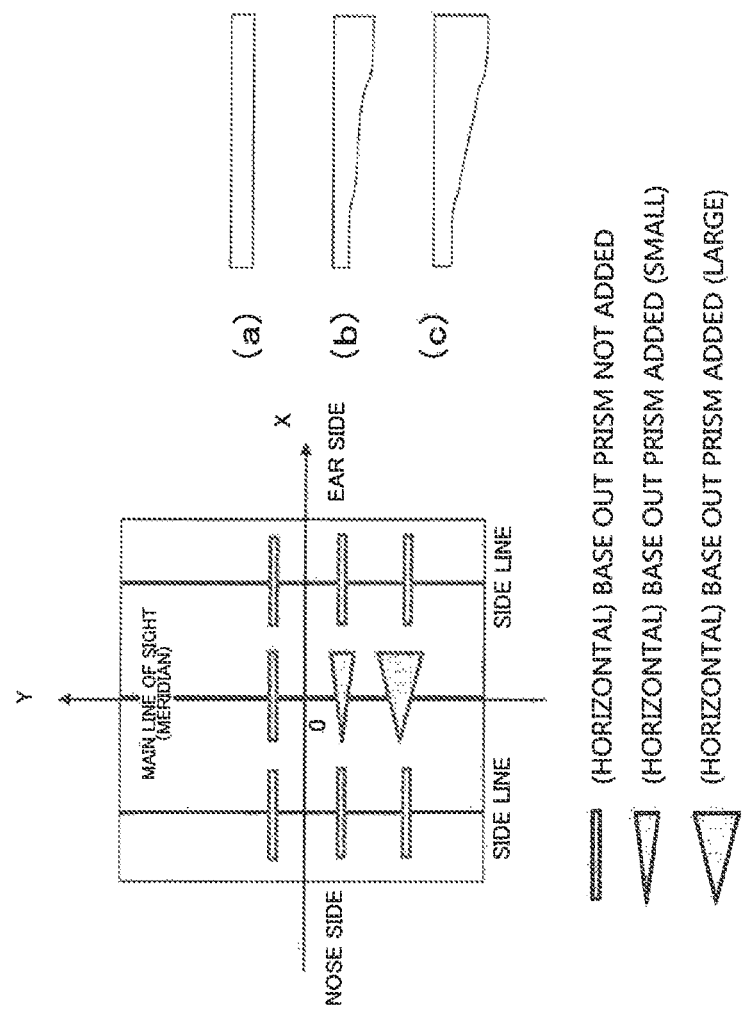
FIG. 7 is a conceptual diagram depicting the control state of the base out prisms in the portion α through which the main line of sight passes, and both sides thereof in the spectral lens according to Example 6.

Returning to the main topic, a difference between an example of providing the base out prism to an entire part lower than the distance power measurement point, the prism power measurement point or the fitting point (Examples 3 to 5), and an example of controlling the base out prism in the portion through which the main line of sight passes and the sides thereof in the spectacle lens (Examples 6 to 8), and the effects of these examples, are described with reference to FIG. 6 and FIG. 7. FIG. 6 and FIG. 7 are conceptual diagrams depicting the control state of the base out prism in the portion through which the main line of sight passes (hereafter merely called "portion α") and the sides thereof in the spectacle lens. To simplify description, the main line of sight is indicated as a straight line in FIG. 6 and FIG. 7. This visually presents the main line of sight along the Y axis, however, this does not mean that the main line of sight is actually extending as a straight line in the vertical direction.

For example, in practical terms, the portion α in the spectacle lens, according to the present invention, may be defined as a portion near the line segment connecting the distance power measurement point F and the near power measurement point N.

In the example of providing the base out prism to the entire part lower than the distance measurement point, the prism power measurement point or the fitting point (Examples 3 to 5), the shape of the base out prism is also disposed in the outer horizontal direction and the inner horizontal direction when viewed from the portion α in the spectacle lens of this embodiment. This is because the base out prism is provided to the portion α, such that the sides of the portion α has the shape of the base out prism as well. In the case of FIG. 6, the shape of the entire inner surface of the spectacle lens in the cross-sectional view in the horizontal direction is continuously (gradually) twisted in the lower direction of the spectacle lens, as in FIG. 6(a)→ FIG. 6(b)→FIG. 6(c). This means continuously (gradually) increasing the parallax in the binocular vision. The processing of the spectacle lens to form this shape is relatively easy, because the base out prism is provided from edge to edge of the lens surface in the horizontal direction. As a result, if this configuration is used, the manufacturing efficiency of the spectacle lens improves.

The above content corresponds to Examples 3 to 5 which will be described later.

Figure 22:
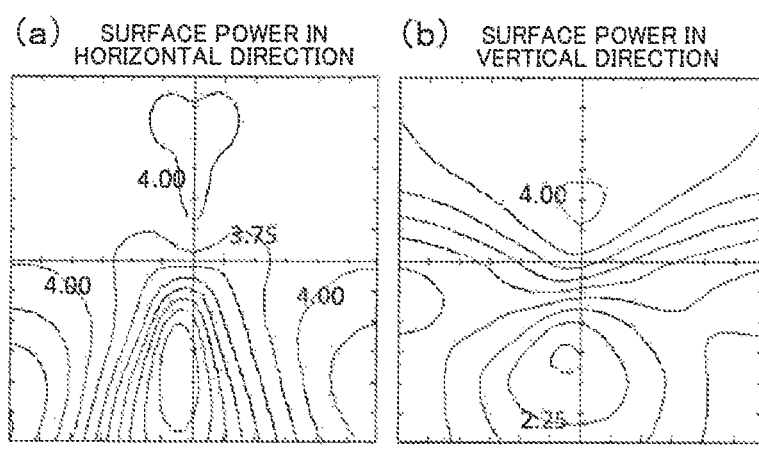
FIG. 22 is a set of diagrams depicting the surface power according to Comparative example 3, where

The above content may be interpreted from the point of view of the distribution of the surface power. This aspect is described below. FIG. 22 is a set of diagrams depicting the distribution of the surface power of the later mentioned Comparative example 3 (reference example, that is, the original progressive surface before the base out prism is provided), where FIG. 22(a) is a distribution map of the surface power in the horizontal direction, and FIG. 22(b) is a distribution map of the surface power in the vertical direction.

Figure 23:
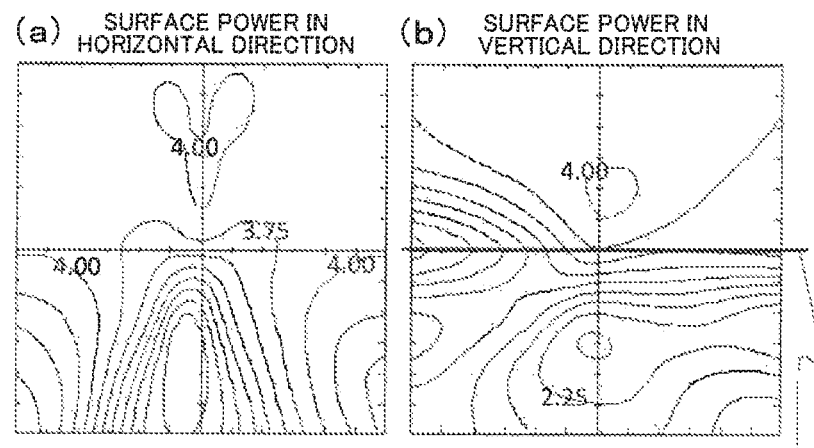
FIG. 23 is a set of diagrams depicting the distribution of a surface power according to Example 3, where

Similar diagrams are also provided for the later mentioned Example 3 and Example 6 in FIG. 23 and FIG. 26 respectively.

The distribution of the surface power in the horizontal direction and in the vertical direction are determined as follows.

When there is a surface, the maximum and minimum curvatures and the directions thereof at each point on the surface are unequivocally determined. Since the surface power is determined by multiplying the curvature by a coefficient of the refractive index, the maximum and minimum surface powers and the directions thereof at each point on the surface are unequivocally determined. If the maximum and minimum surface powers here are Dmax and Dmin respectively, and the direction of the maximum power is AX, then the surface power in an arbitrary direction ($\theta$) at each point on the surface is determined by the following calculation based on Euler's Formula.

$$D = D\max \times \cos^2(\theta - AX) + D\min \times \sin^2(\theta - AX) \quad \text{(Equation 12)}$$

The surface power in the horizontal direction can be determined by substituting $\theta=0$ or 180 in (Equation 12), and the surface power in the vertical direction can be determined by substituting $\theta=90$ or 270 in (Equation 12). By determining the surface powers in the horizontal direction and in the vertical direction at each point on the surface like this, the diagrams in FIG. 21(a) and FIG. 21(b) are acquired.

(Dmax+Dmin)/2 in (Equation 12) indicates the surface mean power, and |Dmax−Dmin| indicates a surface astigmatism.

In a comparison of FIG. 22(b) which depicts the distribution of the surface power in the vertical direction on the original progressive surface before the base out prism is provided, and FIG. 23(b) which depicts the distribution of the surface power in the vertical direction according to Example 3, a major difference is observed in the distributions of the surface power in the vertical direction.

In this example a major difference is not observed in the distributions of the surface power in the horizontal direction, because the base out prism is simply added in the horizontal direction in this example, and the shape of the curve itself of the inner surface of the spectacle lens is not changed in the horizontal direction. In the vertical direction, however, the shape of the curve is changed, and as a result, the above mentioned difference is generated.

Figure 29:
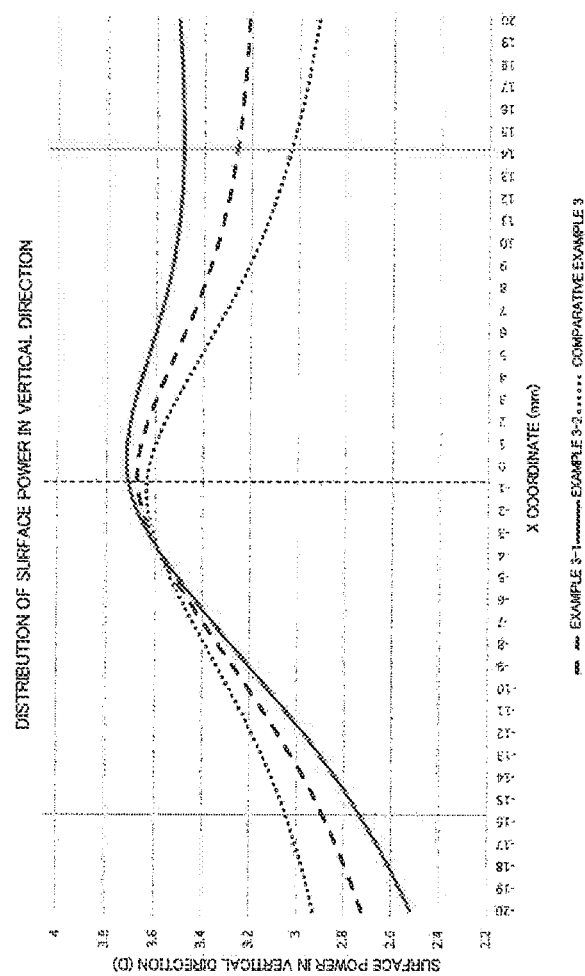
FIG. 29 is a graph for Example 3 and Comparative example 3, plotting a surface power in the vertical direction on a line which is parallel with a horizontal reference line passing through two engraving marks imprinted in the spectacle lens in FIG. 8, and which passes through a point 3 mm higher in the vertical direction from a mid-point of a line segment connecting a distance power measurement point and a near power measurement point.

FIG. 29 is a graph plotting a surface power in the vertical direction on a horizontal line, which is parallel with the horizontal reference line passing through the two engraving marks attached to (e.g. imprinted on) the spectacle lens in FIG. 5, and which passes through a point 3 mm higher in the vertical direction from the mid-point of the line segment connecting the distance power measurement point F and the near power measurement point N. The origin of the graph in FIG. 29 is a point at which the vertical line, passing through the mid-point between the two engraving marks, intersects the above horizontal line. The point through which the main line of sight passes is a point shifted from the origin by 0.9 mm (−0.9 mm in this case) toward the nose in the horizontal direction.

As will be described later in Example 3, as shown in FIG. 29, a major difference is observed between Comparative example 3 and each example when the surface power at a position that is +15 mm from the point where the main line of sight passes (vertical dotted line) and the surface power at a position that is −15 mm from the point where the main line of sight passes are compared. In other words, in the case of Comparative example 3, essentially no difference is observed in the power at the +15 mm position and power at the −15 mm position, but in the case of Example 3, the power is higher on the ear side. This is the same when the amount of the base out prism provided to the spectacle lens is 0.25Δ (Example 3-1) or is 0.50Δ (Example 3-2).

In this example, the spectacle lens for the left eye, where the nose side is on the left, is described as an example as indicated in FIG. 5, but in the case of the spectacle lens for the right eye, the side on which the power is higher is the opposite. Therefore this example can be defined as follows, based on the obvious difference between Comparative example 3 and Example 3 (i.e., this embodiment).

The absolute value of the difference between the surface power values in the vertical direction in the positions ±15 mm from the point through which the main line of sight passes is 0.25 D or more (preferably 0.30 D or more, ideally 0.60 D or more) on the horizontal line which is parallel with the horizontal reference line passing through the two engraving marks and which passes through a point that is 3 mm higher in the vertical direction from the mid-point of the line segment connecting the distance power measurement point F and the near power measurement point N.

The absolute value in Example 3-1 is 0.39 D, and the absolute value in Example 3-2 is 0.77 D. The absolute value in Comparative example 3, on the other hand, is 0.00 D.

Examples 4 and 5 corresponding to this example as well may be defined as above, with changing the position of the horizontal line to determine this absolute value. For example, the following definition may be provided.

The absolute value of the difference between the surface power values in the vertical direction in the positions ±15 mm from the point through which the main line of sight passes is 0.25 D or more (preferably 0.40 D or more, ideally 0.70 D or more) on a line which is parallel with the horizontal reference line passing through the two engraving marks and which passes through the mid-point of the line segment connecting the distance power measurement point F and the near power measurement point N.

The absolute value of the difference between the surface power values in the vertical direction in the positions ±15 mm from the point through which the main line of sight passes is 0.25 D or more (preferably 0.40 D or more, ideally 0.80 D or more) on a line which is parallel with the horizontal reference line passing through the two engraving marks, and which passes through a point that is 3 mm lower in the vertical direction from the mid-point of the line segment connecting the distance power measurement point F and the near power measurement point N.

Each of the above definitions may be used by itself, but it is preferable to appropriately combine these definitions so that the characteristics of this example are enhanced.

For another example, the amount of the base out prism on the sides of the portion α can be suppressed, as illustrated in FIG. 7. In concrete terms, the amount of the added base out prism is reduced from the portion α in the outer horizontal direction and in the inner horizontal direction.

It is true that a base out prism should be provided to implement the demagnification vision function, but the prism in the horizontal direction may be perceived as a distortion on the sides of the portion α. To prevent this, the amount of the prism (base out prism) in the horizontal direction must be minimized on the sides of the portion α. In other words, it is necessary to twist the entire surface shape in the horizontal direction, as in the above example, and then to untwist the sides of the portion α to return to the original state. In this example, the amount of the base out prism is cancelled by changing the power of the spectacle lens (i.e., further changing the surface shape). In concrete terms, the curve itself is changed in a horizontal line on the sides of the lens surface, as shown in FIG. 7, more specifically in FIG. 7(a)→FIG. 7(b)→FIG. 7(c). According to this configuration, a spectacle lens, in which distortion on the sides is reduced while implementing the demagnification vision function, can be provided.

The above content corresponds to Example 6 to 8 which will be described later.

Just like the content corresponding to Example 3 described above, the above content can be interpreted from the point of view of the distribution of the surface power. This aspect is described below. FIG. 26 is a set of diagrams depicting the distribution of the surface power of the later mentioned Example 6, where FIG. 26(a) is a distribution map of the surface power in the horizontal direction, and FIG. 26(b) is a distribution map of the surface power in the vertical direction.

In comparing FIG. 22(a) which depicts the surface power in the horizontal direction on the original progressive surface before the base out prism is provided, and FIG. 26(a) which depicts the distribution of the surface power in the horizontal direction according to Example 6, a major difference is observed in the distribution of the surface power in the horizontal direction. This is because the shape of the curve itself of the inner surface of the spectral lens is changed in the horizontal direction.

Figure 32:
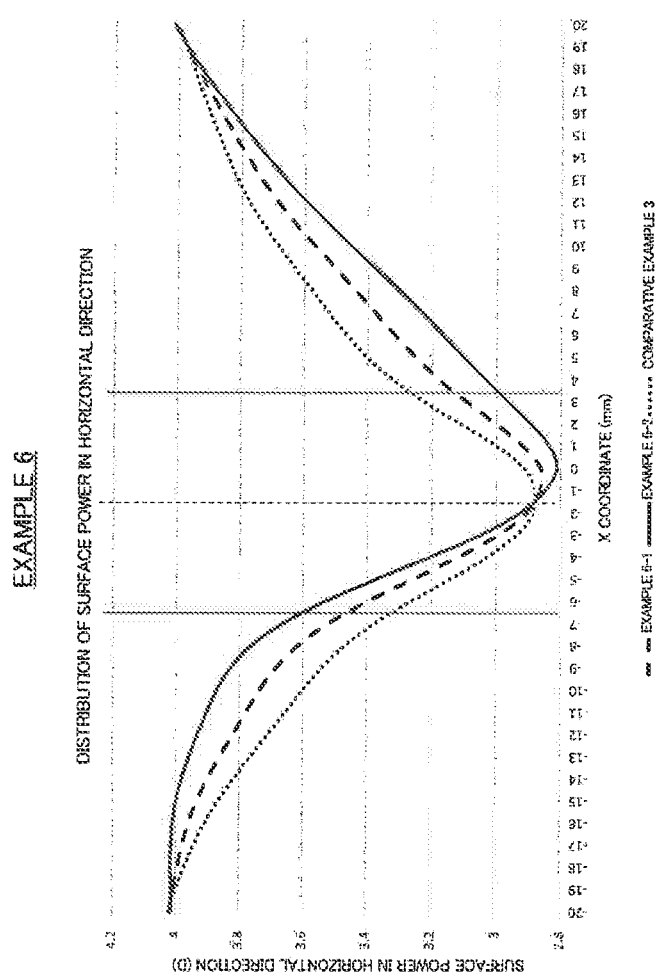
FIG. 32 is a graph for Example 6 and Comparative example 3, plotting a surface power in the horizontal direction on a line which is parallel with a horizontal reference line passing through two engraving marks imprinted in the spectacle lens in FIG. 8, and which passes through a point 3 mm lower in the vertical direction from a mid-point of a line segment connecting a distance power measurement point and a near power measurement point.

FIG. 32 is a graph plotting a surface power in the horizontal direction on a line which is parallel with the horizontal reference line passing through the two engraving marks imprinted on the spectacle lens in FIG. 5, and which passes through a point 3 mm lower in the vertical direction from the mid-point of the line segment connecting the distance power measurement point and the near power measurement point. FIG. 32 relates to Example 6, which corresponds to the above mentioned FIG. 29 (Example 3), where a detailed description on the drawing is omitted.

As will be described later in Example 6, it can be seen from Fig 32 that a major difference is observed between Comparative example 3 and Example 6 when the surface power at a position that is +5 mm from the point where the main line of sight passes (vertical dotted line), and the surface power at a position that is −5 mm from the point where the main line of sight passes, are compared. In other words, in the case of Comparative example 3, essentially no difference is observed in the powers at the +5 mm position and at the −5 mm position, but in the case of Example 6, the power is higher on the nose side. This is the same when the amount of the base out prism provided to the spectacle lens is 0.250Δ (Example 6-1) or is 0.50Δ (Example 6-2).

In this example, the spectacle lens for the left eye, where the nose side is on the left, as illustrated in FIG. 5, is described as an example, but in the case of the spectacle lens for the right eye, the side on which power is higher is the opposite. Therefore this example can be defined as follows, based on the clear difference between Comparative example 3 and Example 6 (i.e., this embodiment).

The absolute value of the difference between the surface power values in the horizontal direction in positions ±5 mm from the point through which the main line of sight passes is 0.12 D or more (preferably 0.20 D or more, ideally 0.40 D or more) on the line which is parallel with the horizontal reference line passing through the two engraving marks, and which passes through a point that is 3 mm lower in the vertical direction from the mid-point of the line segment connecting the distance power measurement point F and the near power measurement point N.

The absolute value in Example 6-1 is 0.33 D, and the absolute value in Example 6-2 is 0.61 D. The absolute value in Comparative example 3, on the other hand, is 0.05 D.

Examples 7 and 8 corresponding to this example as well may be defined as above, with changing the position of the horizontal line to determine this absolute value. For example, the following definition may be provided.

The absolute value of the difference between the surface power values in the horizontal direction in positions ±15 mm from the point through which the main line of sight passes is 0.12 D or more (preferably 0.20 D or more, ideally 0.40 D or more) on a line which is parallel with the horizontal reference line passing through the two engraving marks, and which passes through a mid-point of the line segment connecting the distance power measurement point F and the near power measurement point N.

The absolute value of the difference between the surface power values in the horizontal direction in positions ±15 mm from the point through which the main line of sight passes is 0.12 D or more (preferably 0.20 D or more, ideally 0.40 D or more) on a line which is parallel with the horizontal reference line passing through the two engraving marks, and which passes through a point that is 3 mm higher in the vertical direction from the mid-point of the line segment connecting the distance power measurement point F and the near power measurement point N.

Each of the above definitions may be used by itself, but it is preferable to appropriately combine these definitions so that the characteristics of this example are enhanced.

The amount of adding the base out prism in this case can be arbitrary, as long as the above mentioned functions are exhibited. At the moment, however, according to the research of the present inventors, the demagnification visual effect can be acquired almost with certainty and the influence of aberration and distortion generated by twisting the surface can be minimized if the amount of adding the base out prism is 2Δ or less, in the case of adding the base out prism to the progressive lens from an upper part (e.g. distance portion) to a lower part (near portion) of the lens, even if the individual differences of a user are considered.

In addition to the above content, it is also preferable to set the amount of the base out prism according to this embodiment after considering the following phenomena, that is, the unintended base out prism. This is explained as follows.

As depicted in FIG. 1 and the like of PTL1, the main line of sight, when viewed from the upper part to the lower part of the spectacle lens, is deflected toward the nose of the user (inner horizontal direction) in the lower part of the spectacle lens. This is caused by the movement of the eyeballs toward the direction of nose simultaneously when the lines of sight move from the upper part to the lower part (i.e., convergence eye movement). As the line of sight moves to a lower part, the line of sight is deflected inward, and the main line of sight also changes accordingly.

The main line of sight that is deflected inward means that the main line of sight is not always on the vertical line connecting the upper vertex and the lower vertex of the spectacle lens when seeing the front of the spectacle lens. As a result, a prismatic effect, which the spectacle lens should not have, is exhibited.

Figure 4:
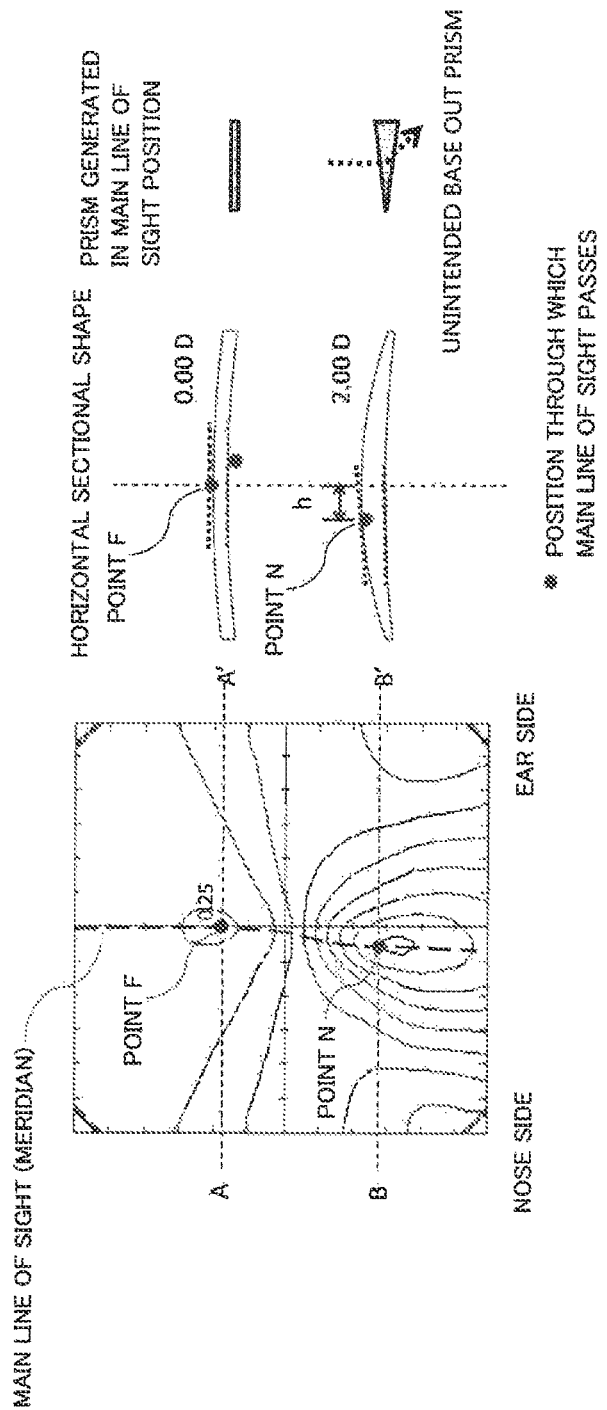
FIG. 4 The distribution map on the left of FIG. 4 indicates the surface mean power in a spectacle lens, so-called outer surface progressive lens, of which the object side surface (outer surface) is a progressive surface and the eyeball side surface (inner surface) is a spherical surface, when the spherical power (S) is 0.00 D, the cylinder power (C) is 0.00 D, and the addition power (ADD) is 2.00 D. The horizontal sectional shape of the spectacle lens in each corresponding portion of the distribution maps is illustrated on the right side of the distribution map.

This is described with reference to FIG. 4. The distribution map on the left of FIG. 4 indicates the surface mean power in a spectacle lens, so-called outer surface progressive lens, of which object side surface (outer surface) is a progressive surface and the eyeball side surface (inner surface) is a spherical surface, when the spherical power (S) is 0.00 D, the cylinder power (C) is 0.00 D, and the addition power (ADD) is 2.00 D. A horizontal sectional shape of the spectacle lens at each corresponding position of the distribution map is illustrated on the right side of the distribution map.

The point F is a point which is on the main line of sight, and exists in the distance portion (e.g. distance power measurement point). In the cross-sectional view of the spectacle lens sectioned at the horizontal line A-A' which passes through the point F, the gradient of the tangential line on the outer surface and the gradient of the tangential line on the inner surface are approximately the same at the point F.

On the other hand, the point N is a point which is on the main line of sight, and exists in the near portion (e.g. near power measurement point). As mentioned above, the main line of sight deflects toward the nose (inner horizontal direction) in the near portion, due to the convergence eye movement. As a result, in the cross-sectional view of the spectacle lens sectioned at the horizontal line B-B' which passes through the point N, the point N deviates from the vertex of the spectacle lens in the cross-sectional view, and the gradient of the tangential line on the outer surface and the gradient of the tangential line on the inner surface become different at the point N. Because of the difference in gradients, the ray along the line of sight is refracted. In other words, in this example, if the main line of sight is set considering convergence, an unintended prism is generated on the main line of sight in the near portion of the spectacle lens.

On the other hand, in this embodiment, the shape of the base out prism is provided to the spectacle lens. The following method is used to clearly distinguish the unintended base out prism and the base out prism of this embodiment. The following method is based on Prentice's formula.

The above content can be defined by the following equations with reference to FIG. 5.

In FIG. 5, the point F' is a point that is distant from the point F by the distance h in the horizontal direction. In this embodiment, the amount of prism in the horizontal direction in the distance portion is measured at the point F', and the amount of prism in the horizontal direction in the near portion is measured at the point N. Thereby the prismatic effect that is generated by the distance power, which is prescribed separately from the addition power, can be suppressed. For this reason, in this embodiment, the equations are established using the amount of prism between the point F' and the point N.

First the amount of prism is determined at the point F' and the point N. For this, the above mentioned Prentice's formula (Equation 7) is applied as follows.

$$P_F = D_F * h/10 \quad \text{(Equation 13)}$$

$$P_N = D_N * h/10 \quad \text{(Equation 14)}$$

Here $P_F$ denotes an amount of prism (Δ) at the point F' and the point F, and $P_N$ denotes an amount of prism (Δ) at the point N. The amount of prism is positive in the case of the base out prism, and negative in the case of the base in prism.

$D_F$ denotes the power (D) of the distance portion in the horizontal direction, and $D_N$ denotes the power (D) of the near portion in the horizontal direction.

Here the unintended base out prism is given by ($P_N - P_F$). Therefore in a conventional progressive multifocal lens which does not include a special prism, the following equation is established.

$$\begin{aligned} P_N - P_F &= (D_N * h/10) - (D_F * h/10) \\ &= (D_N - D_F) * h/10 \\ &= ADD * h/10 \end{aligned} \quad \text{(Equation 15)}$$

The amount of the unintended base out prism (Δ) can be estimated by (ADD*h/10). In other words, if ($P_N - P_F$), measured for an actual spectacle lens, is greater than (ADD*h/10), which is an estimated value of the unintended base out prism, this means that the spectacle lens has a shape including a base out prism other than an unintended base out prism (obviously, a prism that is different from the prescription prism). As a result, the spectacle lens of this embodiment can be specified by the following equation.

$$P_N - P_F > ADD * h/10 \quad \text{(Equation 16)}$$

In addition to (Equation 16), it is preferable to satisfy the following (Equation 17) as well.

$$|P_N - P_F - ADD * h/10| \geq 0.25 \quad \text{(Equation 17)}$$

The left hand side of (Equation 17) indicates the "difference between the amount of an added base out prism and the unintended base out prism". In other words, (Equation 17) indicates that the amount of a base out prism, caused by the shape of the spectacle lens of this embodiment, is more than the unintended base out prism by one-step* (0.25Δ) (* unit used for prescription prism) or more. In other words, the base out prism caused by the shape of the spectacle lens of this embodiment is completely different from the unintended base out prism. It is preferable that the left hand side of (Equation 17) is a value exceeding 0.25Δ.

[Embodiment 3]

In this embodiment, the above mentioned technology related to "a pair of spectacle lenses", that is, a design method (manufacturing method) of the spectacle lens, a supply system of the spectacle lens, and a supply program of the spectacle lens is described.

This embodiment is described in the following sequence.
4. Design method (manufacturing method) of a pair of spectacle lenses for binocular vision
   4-1. Preparation step
   4-2. Design step
   4-3. Manufacturing step 5. Supply system of a pair of spectacle lenses for binocular vision
   5-1. Receiving unit
   5-2. Designing unit
   5-3. Transmitting unit
6. Supply program of a pair of spectacle lenses for binocular vision <4. Design Method (Manufacturing Method) of a Pair of Spectacle Lenses for Binocular Vision>

A design method (manufacturing method) of the spectacle lens according to this embodiment is described. In the following description, the content already described in each of the above embodiments is omitted here. For the content not described in the following, a publically known technology may be adopted. For example, the content on the supply system of the spectacle lens disclosed in WO 2007/077848 may be adopted.

(4-1. Preparation Step)

In this step, preparation is performed for the subsequent design step. A first preparation is acquiring information require for designing the spectacle lens. The information related to the spectacle lens is roughly divided into: item-specific information which is data unique to a lens item; and user-specific information which is data unique to a user. The item-specific information includes information on a refractive index n of the lens material, and progressive designing parameters represented by the progressive portion length. The user-specific information includes the distance power (e.g. spherical power S, cylinder power C, astigmatic axis AX, prism power P, prism base direction PAX), addition power ADD, layout data (e.g. distance PD, near PD, eye point position), frame shape, and parameters on the positional relationship between the frame and eyes (e.g. forward tilting angle, camber angle, distance between vertexes).

(4-2. Design Step)

In this step, the spectacle lens is designed based on the information of the spectacle lens. During the design, a portion for viewing an object at a finite distance (e.g. near portion) is provided to each of the pair of spectacle lenses for binocular vision, and a shape of a base out prism, which is used to direct the line of sight to a direction different from the object when the users sees the object through the near portion, is provided to this portion.

For the design method, a publically known design method, to provide a prism to a spectacle lens, may be adopted. For example, based on the information on the spectacle lens, prior design information on the optical layout of the original progressive surface, before adding the base out prism of this embodiment to generate parallax, is created in advance. Then the design to add the base out prism is performed using this prior design information.

This prior design information on the optical layout of the original progressive surface may also be acquired in advance in the preparation step.

The above design step can be described for each step as follows, for example.

(4-2-1. Step of Acquiring Prior Design Information)

In this step, prior design information on the optical layout of the original progressive surface is acquired in advance.

(4-2-2. Step of Determining Amount of Base Out Prism to be Provided)

In this step, the amount of base out prism is determined. For the determination method, for example β (demagnification) as the target may be determined in (Equation 11) so that P is determined by inverse operation. In this case, the amounts of the base out prism provided to each spectacle lens for binocular vision (e.g. same amounts or different amounts) are also determined in advance.

(4-3. Manufacturing Step)

In this step, the spectacle lens is manufactured based on the result of the design step. For a specific manufacturing method, a publically known method may be adopted. For example, by inputting to a processor the design data acquired in the design step, a lens blank may be processed into a spectacle lens.

Obviously, processing steps other than these steps (e.g. cleaning step, coating) may be added as appropriate if necessary.

For example, when a previous single vision lens is replaced with a new one, a step of calculating β (demagnification) to make the magnification of the new single vision lens close to the magnification of the previous single vision lens (preferably the magnification is 1) may be performed in (4-2-2. Step of determining amount of base out prism to be provided). In this case, it is preferable to acquire various information on the previous single vision lens in advance in the preparation step.

Concerning a progressive power lens, a step of calculating β (demagnification) to reduce the difference between the magnification of the distance portion and the magnification of the near portion may also be performed in (4-2-2. Step of determining amount of base out prism to be provided).

This embodiment is a design method (manufacturing method) of a pair of spectacle lenses for binocular vision, and the above steps concern one of the pair of spectacle lenses. Therefore the above mentioned steps are performed on the other one of the spectacle lenses as well. The amount of base out prism provided to each of the spectacle lenses may be set to the same amount in advance.

Besides the above mentioned content, the content described in [Embodiment 2], for example, may be applied to the design step of this embodiment. This content is described below. For the design method, for example, prior design information on the optical layout of the original progressive surface, before adding base out prism, is created in advance based on the information on the spectacle lens (Comparative example 3, which will be described later). Then the above mentioned method corresponding to Examples 3 to 5 which will be described later (twisting the surface shape), or the method corresponding to Examples 6 to 8 which will be described later (twisting the surface shape first, then untwisting the sides back to the original state), may be applied to the prior design information so as to design the portion α, the side portions, and the other portions. The prior design information on the optical layout of the original progressive surface may be acquired in advance in the preparation step.

By the above configuration, a spectacle lens, which can demagnify an object and allow the user to visually perceive the demagnified object, can be manufactured.

<5. Supply System of a Pair of Spectacle Lenses for Binocular Vision>

Figure 8:
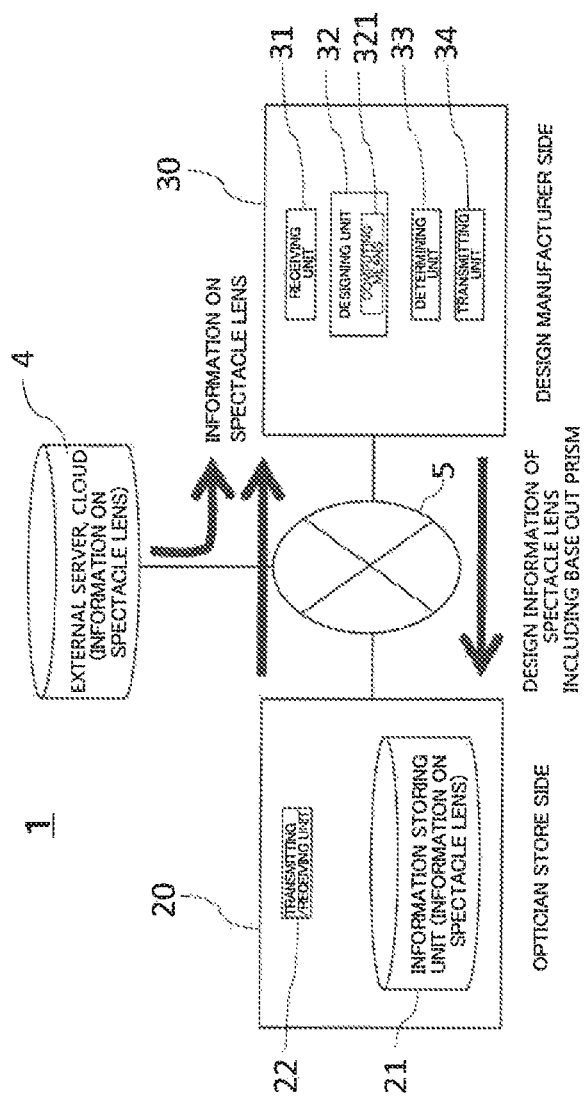
FIG. 8 is a block diagram schematically depicting a spectacle lens supply system according to this embodiment.

The spectacle lens supply system according to this embodiment is now described. The spectacle lens supply system of this embodiment has a control unit for controlling each component, which is described below. In this embodiment, a case where each component, including the control unit, is disposed in a computer installed at a spectacle lens design manufacturer side (design manufacturer side terminal 30), is described. FIG. 8 is a schematic block diagram schematically depicting a spectacle lens supply system 1 according to this embodiment.

(5-1. Receiving Unit 31)

A receiving unit 31 receives information on the spectacle lens from an information storing unit 21 housed in an optical store side terminal 20 via a transmitting/receiving unit 22 using a public line 5. This information is as described above. This information may include the prior design information on the optical layout of the original progressive surface described above as well. This information is normally inputted by an inputting means of a computer installed in an optical store side (optical store side terminal 20). This information may be acquired from a source other than the optical store side terminal 20 (e.g. external server, cloud 4).

(5-2. Designing Unit 32)

A designing unit 32 provides a shape of the base out prism to the near portion, so that the line of sight of the user, when viewing an object through the portion, is directed to a direction that is different from the object, based on the information on the spectacle lens. In order to design the optical layout of the spectacle lens, it is preferable that the designing unit 32 includes a computing means 321 to calculate optical parameters. However, if the optical layout before the base out prism is added is included in the information acquired from a source other than the optical store side terminal 20, the designing unit 32 may, if emphatically expressed, simply add the base out prism to this optical layout. The above mentioned content of the design step, which is a preferred example described in [Embodiment 2], may be performed using this configuration.

A concrete design method is as described in <4. Design method (manufacturing method) of a pair of spectacle lenses for binocular vision>.

(5-3. Transmitting Unit 34)

A transmitting unit 34 transmits the design information acquired from the designing unit 32. The transmission destination is the optical store side terminal 20, for example. The design information (to be more specific, the design information visualized by the surface astigmatism distribution map or the mean power distribution map) is transmitted to the optical store side, and the optical store side confirms this design information, transmits this design information, if there is no problem, to a manufacturer who manufactures the spectacle lens, and requests the manufacturing of this spectacle lens. If the design manufacturer can also manufacture the spectacle lens, the optical store side terminal 20 transmits information to request the manufacturing of the spectacle lens to the design manufacturer side terminal 30.

If the transmitting unit 34 and a processor of the spectacle lens (not illustrated) exist in a same apparatus, the spectacle lens supply system 1 may be called a "spectacle lens manufacturing apparatus".

A configuration, other than the above mentioned composing elements, may be added if necessary.

For example, as described in <4. Design method (manufacturing method) of a pair of spectacle lenses for binocular vision>, when a previous single vision lens is replaced with a new one, the calculation of β (demagnification), to make the magnification of the new single vision lens close to the magnification of the previous single vision lens (preferably magnification is 1), may be performed by the computing means 321 or by another computing unit (not illustrated). In this case, it is preferable that the various information on the previous single vision lens is acquired in advance via the receiving unit 31.

In the same manner, concerning a progressive power lens, the calculation of β (demagnification), to reduce the difference between the magnification of the distance portion and the magnification of the near portion, may be performed by the computing means 321 or by another computing unit (not illustrated).

<6. Supply Program of a Pair of Spectacle Lenses for Binocular Vision>

The technical idea of this embodiment is also reflected in a program to operate the above mentioned spectacle lens supply system 1, and a storage medium thereof. In other words, by using a program which causes a computer (terminal) to performs the function at least as the receiving unit 31, the designing unit 32 and the transmitting unit 34, a spectacle lens which demagnifies an object and allows the user wearing the spectacle lens to visually perceive a magnified object can be supplied, and the spectacle lens which can also suppress unnecessary convergence can be preferably supplied.

[Summary]

According to this embodiment, a base out prism is disposed in each of the pair of spectacle lenses for binocular vision independent from the prescription prism. Thereby parallax is intentionally generated between the eyes when the lines of sight pass through each spectacle lens. Then by fusing each object image which entered through each eye (i.e., "fusion"), which is a process performed by the brain of the user in the case of binocular vision, an image of the object is demagnified, and the magnified image is perceived by the user.

As a result, the problem of the magnification difference within a single lens can be solved in the case of the progressive power lens, and in the case of another spectacle lens (e.g. single vision lens), the problem of the magnification difference between the previous spectacle lens and the new spectacle lens, when the user replaces the previous spectacle lens with a new one, can be solved.

Further, according to the preferred example, the base out prism is provided in an area lower than the distance power measurement point, the prism power measurement point or the fitting point, therefore parallax is not generated in the binocular vision in the distance portion where the lines of sign are parallel. As a result, when the user sees from a distance, the lines of sight become parallel and natural. On the other hand, when the user sees an object at a finite distance, the user can visually perceive a virtual image of the object in the reduced state.

In this embodiment, the shape of the spectacle lens is a "shape" that includes the base out prism. The above mentioned "unintended base out prism", on the other hand, is generated depending on the position of the line of sight, and is not caused by providing the shape of the prism to the spectacle lens. In other words, an unintended base out prism, generated in a prior art, is completely different from the shape of the base out prism that is provided to the shape of the spectacle lens according to this embodiment.

[Modification]

The technical scope of the present invention is not limited to the above mentioned embodiments, but includes various changes and modifications within the scope of achieving specific effects acquired by the constituent elements of the invention and combinations thereof.

(Spectacle Lens)

In the case of an occupational lens or a near vision lens, the distance portion in (Equation 16) and (Equation 17) is regarded as a portion for viewing a specific distance (e.g. distance power measurement point F→specific distance power measurement point), and the near portion is regarded as a portion for viewing a distance closer than the specific distance.

In [Embodiment 2], even in the case of a single vision lens having plus power, where power changes while moving away from a region to see an object at a predetermined distance, a progressive portion where plus power is added in the lower direction of the spectacle lens still exists, since only in this case the above mentioned distance portion (region which is for seeing from a distance and in which power is approximately constant) does not exist. Even in the case where the distance power measurement point does not exist, a power measurement point, to check whether a predetermined power is acquired, which exists in a predetermined position on the spectacle lens, may be regarded as the above mentioned "power measurement point in the portion for viewing a specific distance".

(Twisting Shape)

In [Embodiment 2], which described a case of the inner surface progressive lens, twisting the shape of the inner surface was described as an example. On the other hand, the prismatic effect can be exhibited only if there is a difference between the gradient of the tangential line on the outer surface and the gradient of the tangential line on the inner surface at a portion where the main line of sight passes through in the cross-sectional view of the spectacle lens in the horizontal direction. Therefore the shape of the outer surface may be continuously twisted in the lower direction of the spectacle lens, or both the inner and outer surfaces may be continuously twisted.

Further, [Embodiment 2] described a case where the surface shape is continuously twisted in the lower direction from the distance power measurement point F or the prism power measurement point P, so as to continuously increase the base out prism, but the base out prism may be generated not by continuously twisting the surface shape but by evenly inclining the entire shape of the inner surface. However, the above mentioned twisting method is preferable since the line of sight is gradually deflecting toward the nose in the convergence, and the prism on the side of the lens surface in the horizontal direction tends to distort.

The above mentioned twisting may be applied to a part of the portion α. However applying the above mentioned twisting to all of the portion α is preferable to balance the shape of the spectacle lens.

If the portion where the power changes is only a part of the spectacle lens, and power continuously changes only in this part, then the above mentioned shape can be used only to this part.

EXAMPLES

The present invention is described concretely using the following examples. Needless to say, the present invention is not limited to these examples.

As described above in brief, comparative examples is described first in this section as reference examples. Each comparative example described below is an example of a spectacle lens before the base out prism is provided.

Each example described below, on the other hand, is an example of the spectacle lens having a shape, in which a base out prism, to direct the line of sight of the user viewing an object via the near portion to a direction different from the object, is added.

Each example is now described.

Comparative Example 1 (Reference Example)

In this example, a pair of single vision spectacle lenses for presbyopia are fabricated. The parameters of each lens are as follows: the spherical power (S) is +3.50 D, and the cylinder power (C) is 0.00 D. The other parameters are: the base curve is 7.00 D, the refractive index is 1.50, the prism prescription is 0, and the center thickness is 5.00 mm.

Then, for instance, under the conditions H=32 mm and W=330 mm in FIG. 2, β (demagnification) is calculated based on the assumption that (Equation 11) is established. In this example, the amount of prism is 0, therefore β=1.00.

Example 1

A pair of single vision spectacle lenses for presbyopia are fabricated using the same parameters as Comparative example 1 (reference example). In Example 1, however, a base out prism is added to each of the spectacle lenses respectively. The amount of prism is 0.5Δ.

Then β (demagnification) is calculated using (Equation 11). As a result, β=0.951, and the size of the virtual image is 0.951 times the size of the actual image of the object (5% decrease), which allows the user to visually perceive the object in the reduced state.

In addition to the above content, a case of the user replacing a previous spectacle lens with a new single vision lens is tested.

The previous spectacle lens is set such that: S is +1.00, the base curve (BC) is 4.00, the center thickness is 2.5 mm, and an object that is 33 cm ahead of the user is seen at the near power measurement point N, and L in FIG. 2 is set to 12.5 mm. In this case, based on the calculation using (Equation 1) to (Equation 3), the magnification SM is 1.0194.

On the other hand, the new spectacle lens is set such that: S is +3.50, the base curve (BC) is 7.00, the center thickness is 5.0 mm, and an object that is 33 cm ahead of the user is seen at the near power measurement point N, and L in FIG. 2 is set to 12.5 mm. In this case, based on the calculation using (Equation 1) to (Equation 3), the magnification SM is 1.0707.

In other words, the relative magnification change is 1.0707/1.0194-1.0503. This means that an object looks about 5% larger through the newly purchased spectacle lens compared with the previous one.

If the spectacle lens to which 0.50Δ of base out prism is provided is used, on the other hand, as in the case of this example, β (demagnification) becomes 0.951. As a result, the above mentioned magnification change becomes 1.0503*0.951=0.9988, which is very close to 1. As a result, even if the user replaces the previous spectacle lens with the new spectacle lens, this new spectacle lens can be worn without discomfort.

Comparative Example 2 (Reference Example)

In this example, an inner surface progressive lens which has a distance portion, a near portion, and a progressive portion existing therebetween on the inner surface (the outer surface is a spherical surface), is used for each of the spectacle lenses. Therefore the following results are results on the inner surface. The spherical power (S) is 0.00 D, the cylinder power (C) is 0.00 D, and the addition power (ADD) is 1.50 D. The other parameters are as follows: the base curve is 4.00 D, the refractive index is 1.60, the prism prescription is 0, and the center thickness is 2.00 mm. Then, for instance, under the same conditions as H and W described in [Embodiment 1] with reference to FIG. 2 (H=32 mm, W=330 mm), that is, in a near vision state, β (demagnification) in the near portion is calculated based on the assumption that (Equation 11) is established. In this example, the amount of prism is 0, therefore the magnification in the near portion is β=1.00.

Example 2

A pair of inner surface progressive lenses are fabricated using the same parameters as Comparative example 2 (reference example). In Example 2, however, a base out prism is added to each of the spectacle lenses respectively. The amount of prism is 1Δ.

Then β (demagnification) in the near portion is calculated using (Equation 11). As a result, β=0.907, and the size of the virtual image is 0.907 times the size of the actual image of the object (about a 10% decrease), which allows the user to visually perceive the object in the reduced state.

In addition to the above content, the magnification difference between the distance portion and the near portion of the progressive power lens is tested.

The distance portion is set such that: S is +1.00, Pb of the base curve (BC) is 5.00, the center thickness is 5.0 mm, and an object that is 33 cm ahead of the user is seen at the near power measurement point N, and L in FIG. 2 is set to 12.5 mm. In this case, based on the calculation using (Equation 1) to (Equation 3), the magnification SMf of the distance portion is 1.0298.

The near portion is set such that: S is +3.50, Pb of the base curve (BC) is 7.50, the center thickness is 5.0 mm, and an object that is 33 cm ahead of the user is seen at the near power measurement point N, and L in FIG. 2 is set to 12.5 mm. In this case, based on the calculation using (Equation 1) to (Equation 3), the magnification SMn of the near portion is 1.0726.

In other words, the difference between the magnification of the distance portion and the magnification of the near portion is 0.0427.

If the spectacle lens, to which 1Δ of base out prism is provided, is used as in this example, on the other hand, β (demagnification) becomes 0.951, as mentioned above. As a result, the magnification of SMf of the distance portion becomes 1.0298*0.951-0.9335, and the magnification SMn of the near portion becomes 1.0726*0.951=0.9772.

In other words, the difference between the magnification of the distance portion and the magnification of the near portion is 0.0387.

As a result, the difference between the magnification of the distance portion and the magnification of the near portion can be decreased by using the shape that includes the base out prism for the spectacle lens, as in this example, thereby fluctuation and distortion can be reduced.

In the following examples, (3-1. Handling of convergence in front view) and (3-2. Continuously adding a base out prism) in [Embodiment 2] are applied.

As brief described above, Comparative example 3 is a reference example. Comparative example 3 is an example of a spectacle lens before adding the base out prism.

In Example 3, on the other hand, a base out prism is provided in a part lower than the prism power measurement point P, so that the "convergence in the front view" is handled. In addition to this, the inner surface shape of the spectacle lens in the horizontal sectional view is continuously twisted in the lower direction of the spectacle lens. Example 3 is an example of the spectacle lens after such processing is performed.

Example 6 is an example of the spectacle lens where the shape (shape of the curve itself) of the spectacle lens of Example 3 is deformed in the horizontal direction on the sides of the portion α.

Each example is described below.

Comparative Example 3 (Reference Example)

In this example, an inner surface progressive lens is used, just like Comparative example 2. For the prescription, the spherical power (S) is 0.00 D, the cylinder power (C) is 0.00 D, and the addition power (ADD) is 2.00 D. The other parameters are as follows: the base curve is 4.00 D, the refractive index is 1.60, the prism prescription is 0, and the center thickness is 2.00 mm. When the geometric center is the origin, the coordinates of the distance power measurement point F are (0.0, 8.0), the coordinates of the near power measurement point N are (−2.5, −14.0), the coordinates of the prism power measurement point are (0.0, 0.0), and the coordinates of the fitting point are (0.0, 4.0). In this example, it is assumed that the line connecting the distance power measurement point F and the near power measurement point N is the part corresponding to the main line of sight.

Figure 9:
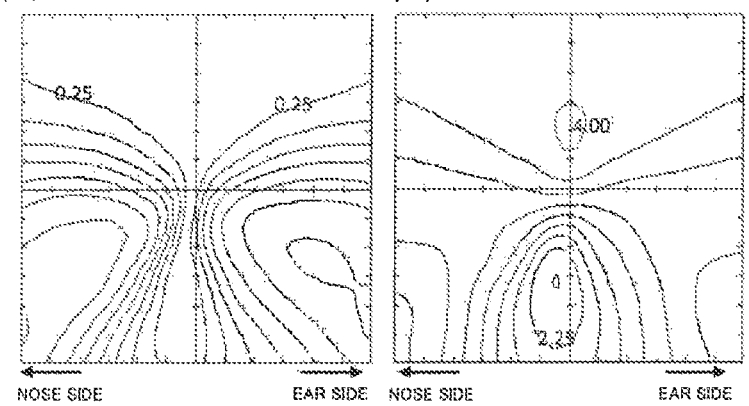
FIG. 9 is a set of diagrams of a spectacle lens according to Comparative example 3 (reference example), where

FIG. 9 is a set of diagrams depicting the prior design information on the optical layout of the original progressive surface acquired as the result. FIG. 9(a) is a distribution map of a surface astigmatism, and FIG. 9(b) is a distribution map of a surface mean power.

In this and subsequent examples, the astigmatic power is set to 0.00 D. However, it is also possible that the astigmatic power is provided in the spectacle lens because of an astigmatic prescription. Even in this case, the astigmatic power corresponding to the astigmatic prescription can be subtracted, i.e., subjected to vector subtraction, or in the case of the progressive multifocal lens, the surface astigmatism at the distance measurement reference point can be subtracted, i.e., subjected to vector subtraction. Then the distribution map of the surface mean power corresponding to FIG. 9(b) is acquired.

Example 3

Compared to the spectacle lens of Comparative example 3, according to this example, in the inner surface of the spectacle lens, the tangential line on a point of the main line of sight is set to ascend toward the nose in the horizontal sectional view, and is set to descend toward the ear in the horizontal sectional view. Further, the base out prism is continuously provided to the spectacle lens by continuously twisting the inner surface from the prism power measurement point P to the near power measurement point N. The amount of base out prism at the prism power measurement point P is 0, and the amount of base out prism at the near power measurement point N is 0.25Δ (Example 3-1) and 0.50Δ (Example 3-2). Therefore β (demagnification) at the near power measurement point N is 0.975 in Example 3-1 and 0.951 in Example 3-2, that is, the object can be visually perceived in the reduced state, and the effect of the present invention is exhibited.

Figure 10:
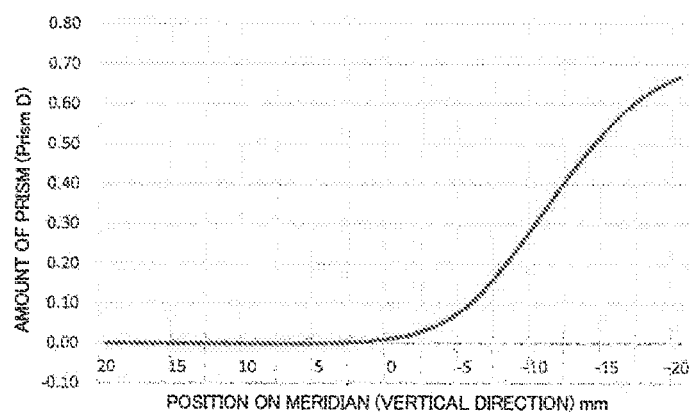
FIG. 10 is a graph depicting an amount of the prism added to the lens as a result of continuously twisting the inner surface of the lens in Example 3, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

FIG. 10 (Example 3-2) depicts the result when the inner surface is continuously twisted like this. The abscissa in FIG. 10 indicates the position of a contact between the main line of sight and the inner surface in the vertical direction when the origin is an intersection point of a line segment passing through two engraving marks and the main line of sight (e.g. center of the two engraving marks), where the positive direction is the upper direction of the spectacle lens, and the negative direction is the lower direction of the spectacle lens, and the ordinate indicates the amount of base out prism (plus sign) that is added as a result of continuously twisting the inner surface.

As depicted in FIG. 10, the spectacle lens is designed such that the absolute value of the base out prism continuously increases by continuously twisting the shape of the inner surface in the lower direction from the point corresponding to the prism power measurement point P (a point where a line, which is parallel with the horizontal reference line passing through the two engraving marks, and which passes through the prism power measurement point P, intersects with the main line of sight).

Figure 16:
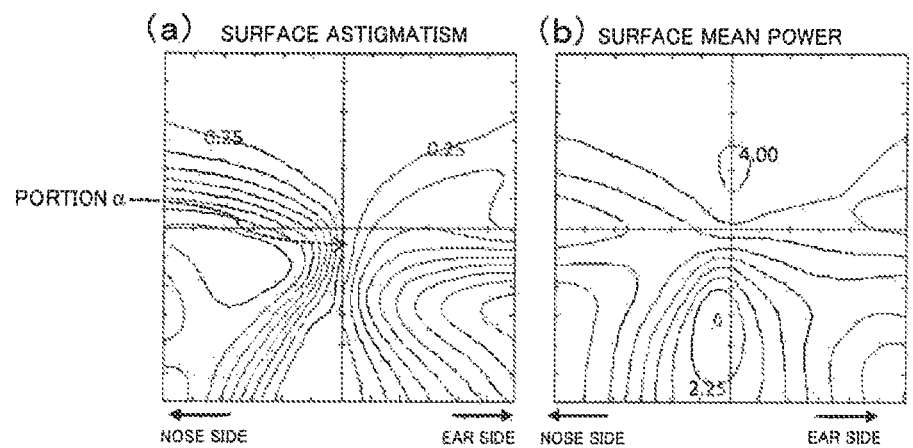
FIG. 16 is a set of diagrams of the spectacle lens according to Example 3, where

FIG. 10 (Example 3-2) depicts the design information acquired in this example. FIG. 16(a) is a distribution map of a surface astigmatism, and FIG. 16(b) is a distribution map of a surface mean power.

As depicted in FIG. 23(b), which is a distribution map of the surface power in the vertical direction, and FIG. 29, in which the surface power in the vertical direction is plotted, the absolute value of the difference between the surface power values in the ±15 mm positions, is 0.39 D in the case of Example 3-1, and 0.77 D in the case of Example 3-2, both exceeding the specified 0.25 D value.

Example 4

Figure 11:
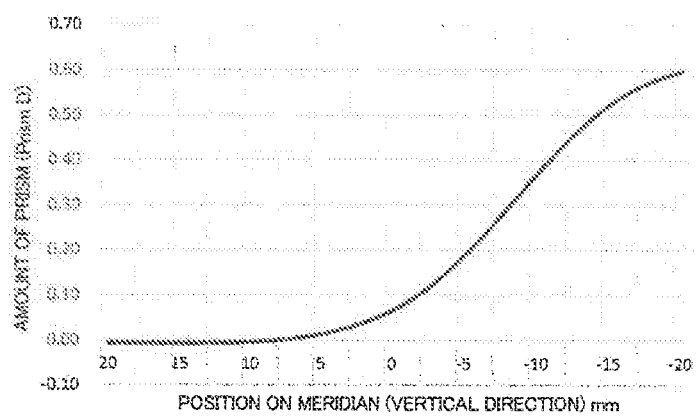
FIG. 11 is a graph depicting an amount of the prism added to the lens as a result of continuously twisting the inner surface of the lens in Example 4, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 3, but an aspect of continuously adding the base out prism is changed, as depicted in FIG. 11. In concrete terms, the base out prism is continuously added, starting from the mid-position between the distance power measurement point and the prism power measurement point. The amount of the base out prism at the near power measurement point N is 0.25Δ (Example 4-1) and 0.50Δ (Example 4-2). β (demagnification) in each example is the same as that of Example 3.

Figure 17:
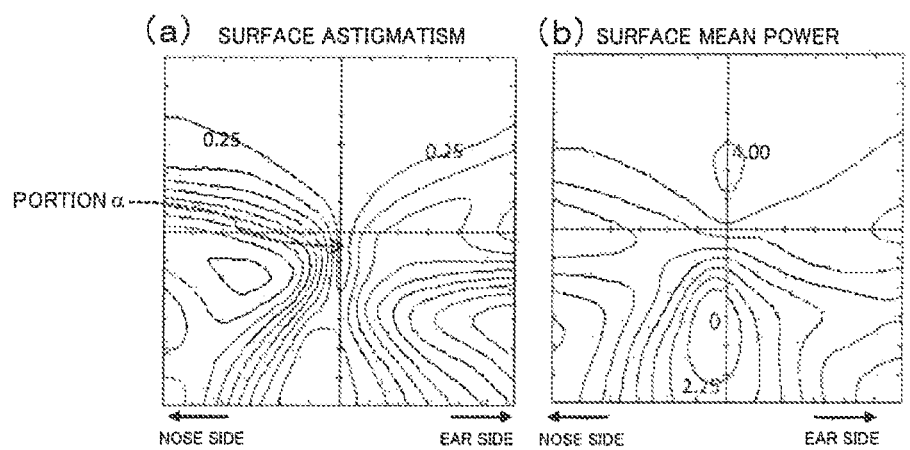
FIG. 17 is a set of diagrams of the spectacle lens according to Example 4, where

FIG. 17 (Example 4-2) depicts the design information acquired in this example. FIG. 17(a) is a distribution map of a surface astigmatism, and FIG. 17(b) is a distribution map of a surface mean power.

Figure 24:
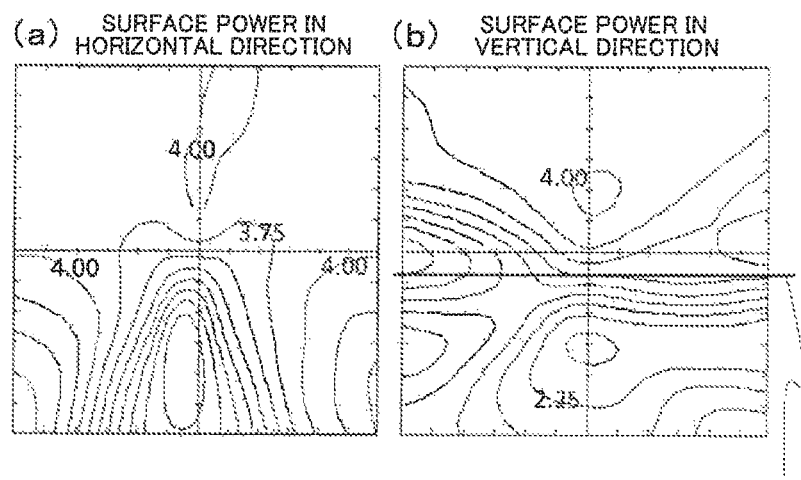
FIG. 24 is a set of diagrams depicting the distribution of a surface power according to Example 4, where
Figure 30:
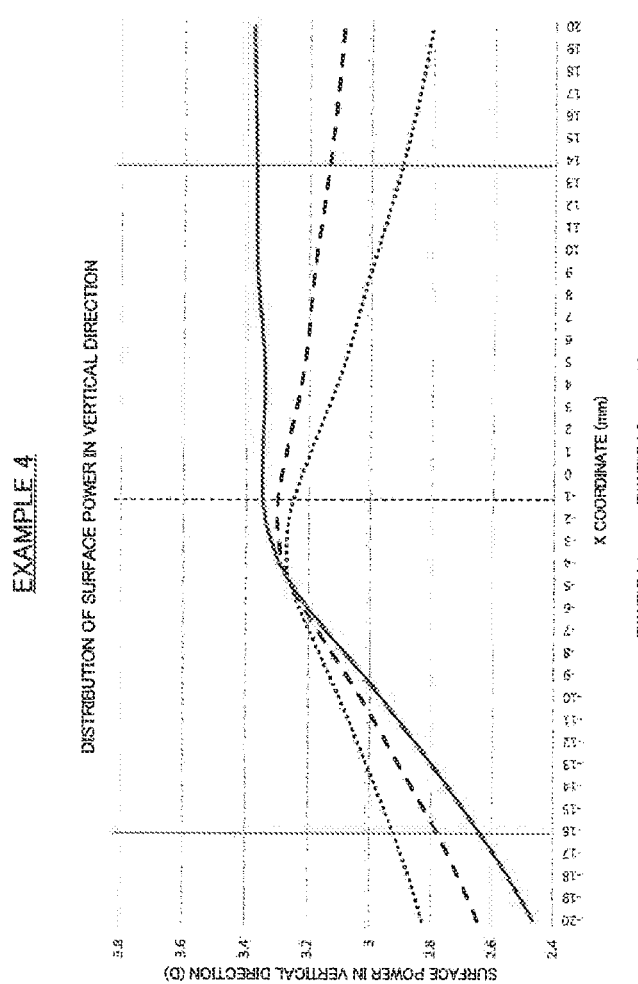
FIG. 30 is a graph for Example 4 and Comparative example 3, plotting a surface power in the vertical direction on a line which is parallel with a horizontal reference line passing through two engraving marks imprinted in the spectacle lens in FIG. 8, and which passes through a mid-point of a line segment connecting a distance power measurement point and a near power measurement point.

As depicted in FIG. 24(b) which is a distribution map of the surface power in the vertical direction, and FIG. 30 in which the surface power in the vertical direction is plotted, the absolute value of the difference between the surface power values in the portions ±15 mm from the reference position through which the main line of sight passes, on a line which is parallel with the horizontal reference line passing through the two engraving marks and which passes through the mid-point of the line segment connecting the distance power measurement point and the near power measurement point, is 0.35 D in the case of Example 4-1, and 0.73 D in the case of Example 4-2, both exceeding the specified 0.25 D value. In this example, the position where the main line of sight passes is −1.25 mm in the X coordinate in FIG. 30.

Example 5

Figure 12:
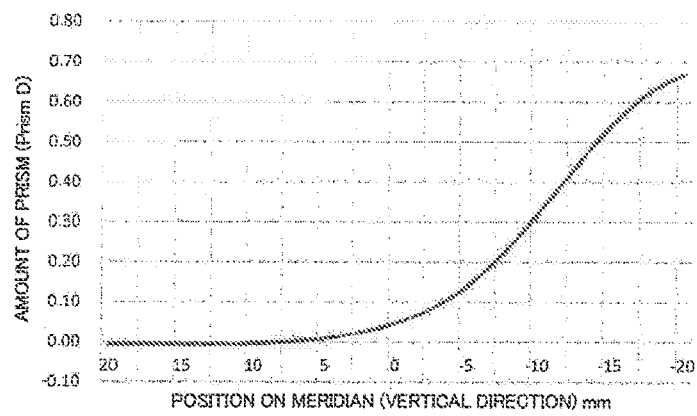
FIG. 12 is a graph depicting an amount of the prism added to the lens as a result of continuously twisting the inner surface of the lens in Example 5, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.
Figure 13:
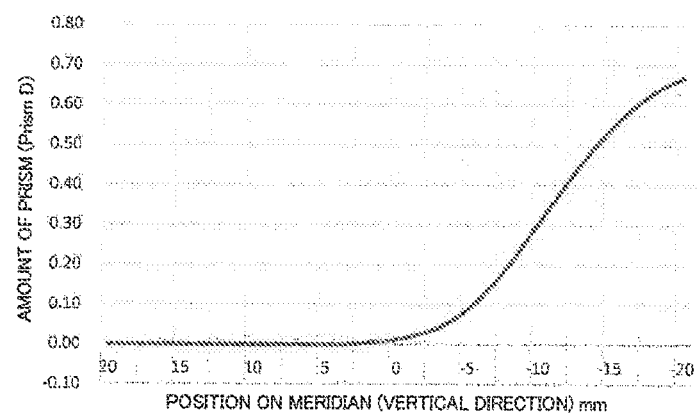
FIG. 13 is a graph depicting an amount of the prism added to the lens as a result of continuously twisting the inner surface of the lens in Example 6, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 3, but an aspect of continuously adding the base out prism is changed, as depicted in FIG. 12. In concrete terms, the base out prism is continuously added, starting from the fitting point. The amount of the base out prism at the near power measurement point N is 0.25Δ (Example 5-1) and 0.50Δ (Example 5-2). β (demagnification) in each example is the same as that of Example 3.

Figure 18:
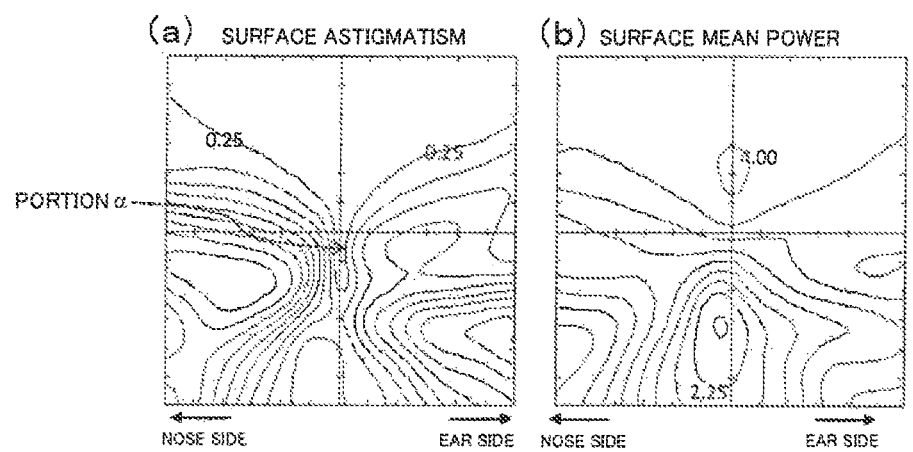
FIG. 18 is a set of diagrams of the spectacle lens according to Example 5, where

FIG. 18 (Example 5-2) depicts the design information acquired in this example. FIG. 18(a) is a distribution map of a surface astigmatism, and FIG. 18(b) is a distribution map of a surface mean power.

Figure 25:
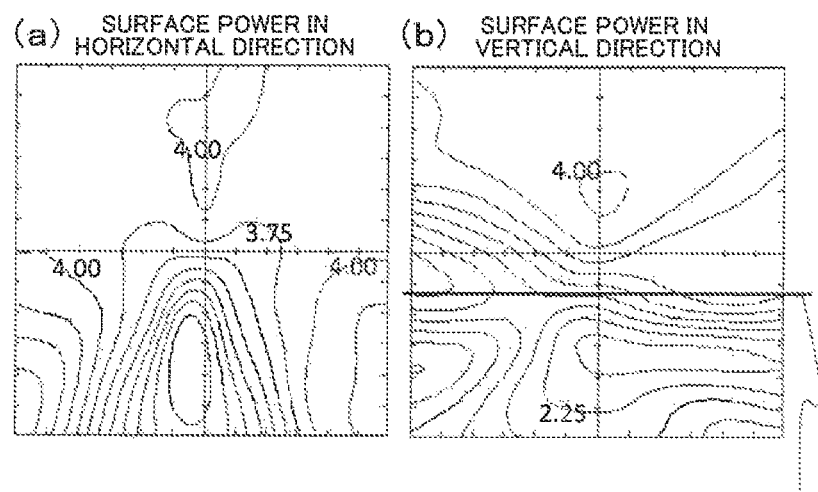
FIG. 25 is a set of diagrams depicting the distribution of a surface power according to Example 5, where
Figure 31:
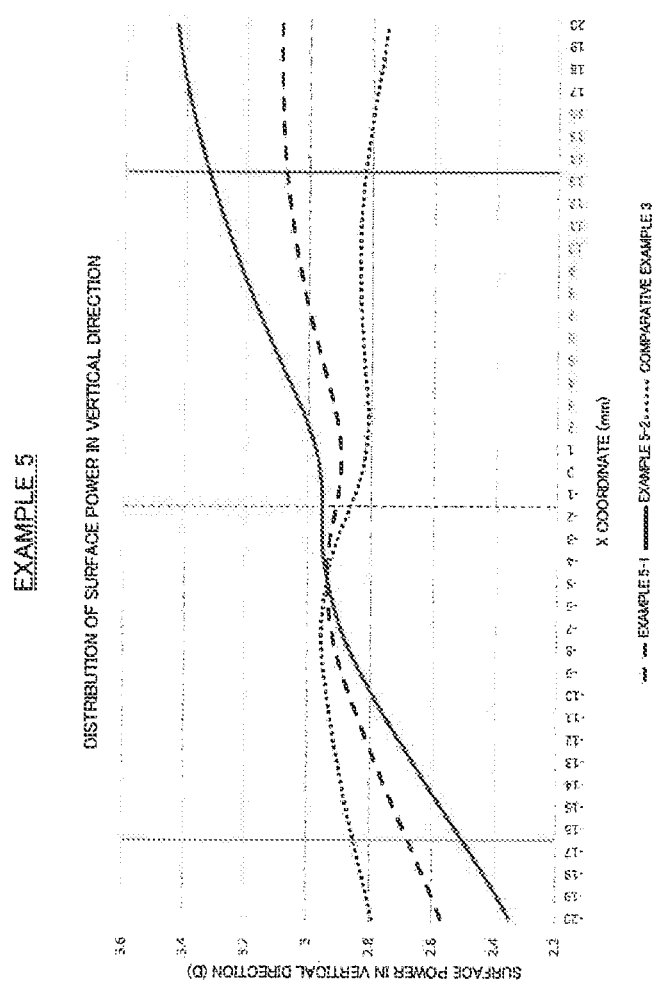
FIG. 31 is a graph for Example 5 and Comparative example 3, plotting a surface power in the vertical direction on a line which is parallel with a horizontal reference line passing through two engraving marks imprinted in the spectacle lens in FIG. 8, and which passes through a point 3 mm lower in the vertical direction from a mid-point of a line segment connecting a distance power measurement point and a near power measurement point.

As depicted in FIG. 25(b), which is a distribution map of the surface power in the vertical direction, and FIG. 31 in which the surface power in the vertical direction is plotted, the absolute value of the difference between the surface power values in the positions ±15 mm from the reference position through which the main line of sight passes, on a line which is parallel with the horizontal reference line passing through the two engraving marks and which passes through a point that is 3 mm lower in the vertical direction from the mid-point of the line segment connecting the distance power measurement point and the near power measurement point, is 0.40 D in the case of Example 5-1 and 0.82 D in the case of Example 5-2, both exceeding the specified 0.25 D value. In this example, the position where the main line of sight passes is −1.59 mm in the X coordinate in FIG. 31.

Based on the results of Examples 3 to 5, the following can be stipulated.

A shape of continuously (gradually) twisting at least one of the shapes of the object side surface and the eyeball side surface of the spectacle lens in the horizontal sectional view of the portion α, in the lower direction of the spectacle lens, is provided to the portion α.

In this state, the absolute value of the difference between the surface power values in the vertical direction in the positions ±15 mm from the point through which the main line of sight passes is 0.25 D or more, on a line which is parallel with the horizontal reference line passing through the two engraving marks of the spectacle lens, and which passes through any point on the line segment between the distance power measurement point F and the near power measurement point N.

In addition to this, any point on the line segment connecting the distance power measurement point F and the near power measurement point N is located in a ±3 mm range in the vertical direction from the mid-point as reference between the distance power measurement point F and the near power measurement point N.

Example 6

In this example, the shape (shape of the curve itself) of the spectacle lens of Example 3 is deformed on the sides of the portion α. In concrete terms, the base out prism is continuously provided by continuously twisting the inner surface from the prism power measurement point P to the near power measurement point N, just like Example 3. The amount of base out prism at the prism power measurement point P is 0, and the amount of base out prism at the near power measurement point N is 0.25Δ (Example 6-1) and 0.50Δ (Example 6-2). β (demagnification) of each example is the same as that of Example 3. Then the shape of the inner surface is gradually deformed on the sides of the portion α so as to be close to the distribution map of the surface astigmatism in FIG. 9(a) according to Comparative example 3 as a reference example, and in this way designing is implemented as appropriate.

Figure 19:
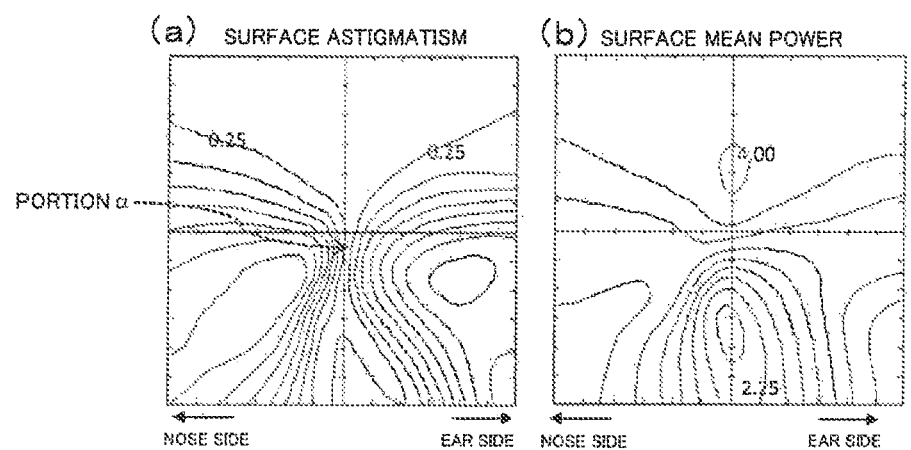
FIG. 19 is a set of diagrams of the spectacle lens according to Example 6, where

In Example 6-2, deformation ends when the state in FIG. 19(a) is generated. FIG. 19(b) is a distribution map of the surface mean power of the spectacle lens acquired as the result.

Further, in the distribution map of the surface astigmatism of this example (FIG. 19(a)), the layout surface astigmatism similar to the distribution map of the surface astigmatism of the progressive surface, before adding the base out prism (Comparative example 3, FIG. 9(*a*)), is acquired.

Figure 26:
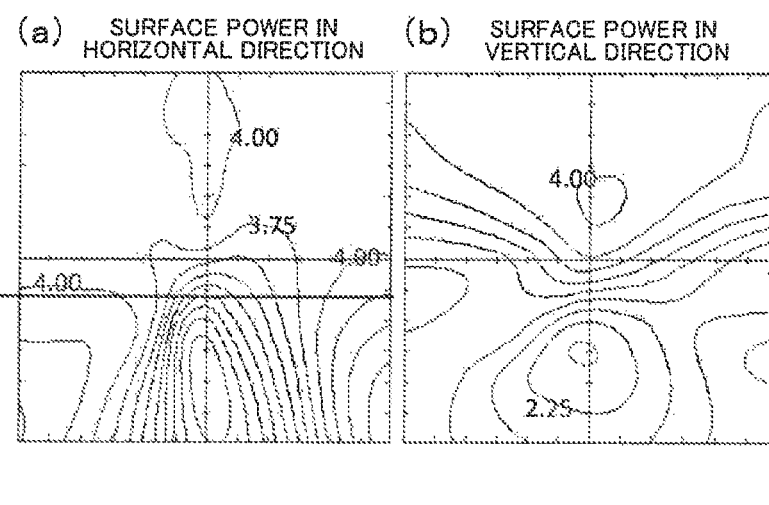
FIG. 26 is a set of diagrams depicting the distribution of a surface power according to Example 6, where

As depicted in FIG. 26(*a*) which is a distribution map of the surface power in the horizontal direction, and FIG. 32 in which is a surface power in the horizontal direction is plotted, the absolute value of the difference between the surface power values in the positions ±5 mm from the reference position through which the main line of sight passes, on a line which is parallel with the horizontal reference line passing through the two engraving marks, and which passes through a point that is 3 mm lower in the vertical direction from the mid-point of the line segment connecting the distance power measurement point F and the near power measurement point N, is 0.33 D in the case of Example 6-1, and 0.61 D in the case of Example 6-2, both at or over 0.12—the specified D value. In this example, the main line of sight is defined as a line segment connecting the distance power measurement point and the near power measurement point, but the position where the main line of sight passes is −1.59 mm in the X coordinate in FIG. 32.

Example 7

Figure 14:
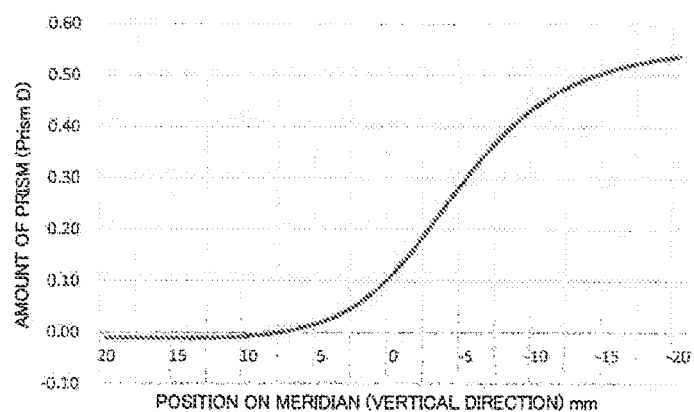
FIG. 14 is a graph depicting an amount of the prism added to the lens as a result of continuously twisting the inner surface of the lens in Example 7, where the abscissa indicates the vertical position of a contact between the main line of sight and the inner surface when the origin is an intersection point of a line segment passing through two engraving marks and the main line of sight (positive direction is the upward direction of the spectacle lens, and negative direction is the downward direction of the spectacle lens), and the ordinate indicates the amount of prism that is added.

In this example, the design conditions are the same as Example 6, but the aspect of continuously adding the base out prism is changed, as depicted in FIG. 14. In concrete terms, the base out prism is continuously added, starting from the mid-position between the distance power measurement point F and the prism power measurement point P. The amount of the base out prism at the near power measurement point N is 0.25Δ (Example 7-1) and 0.50Δ (Example 7-2). β (demagnification) in each example is the same as that of Example 3.

Figure 20:
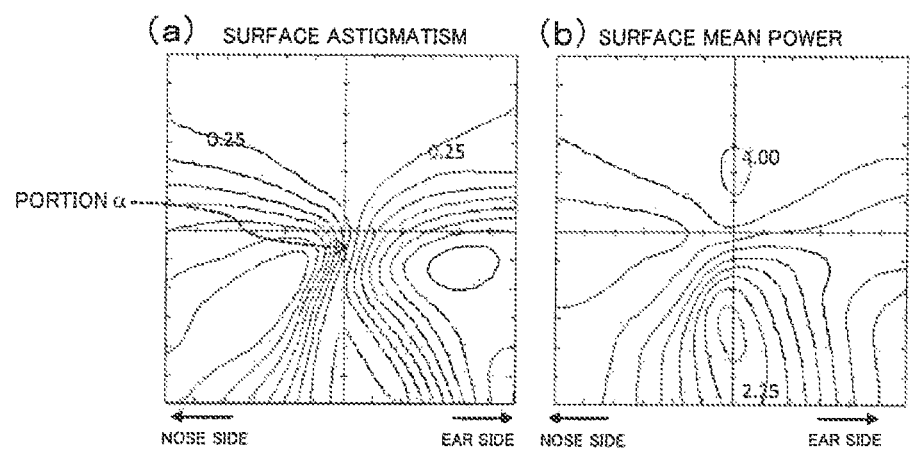
FIG. 20 is a set of diagrams of the spectacle lens according to Example 7, where

FIG. 20 (Example 7-2) depicts the design information acquired in this example. FIG. 20(*a*) is a distribution map of a surface astigmatism, and FIG. 20(*b*) is a distribution map of the surface mean power.

Figure 27:
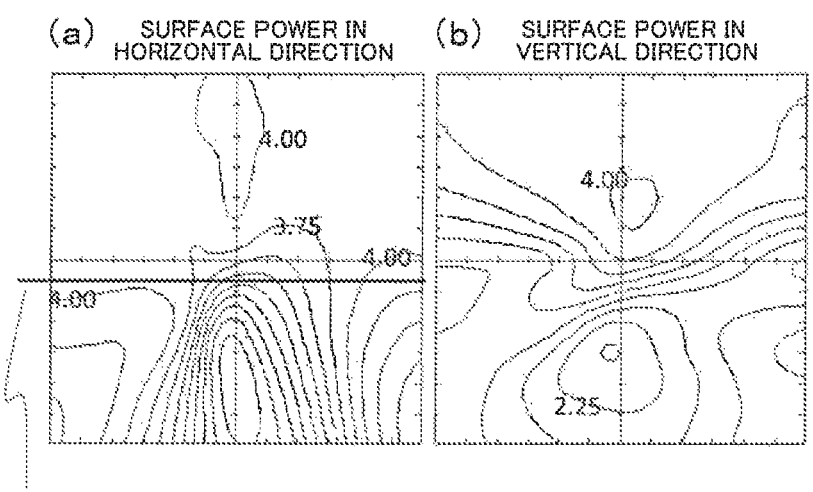
FIG. 27 is a set of diagrams depicting the distribution of a surface power according to Example 7, where
Figure 33:
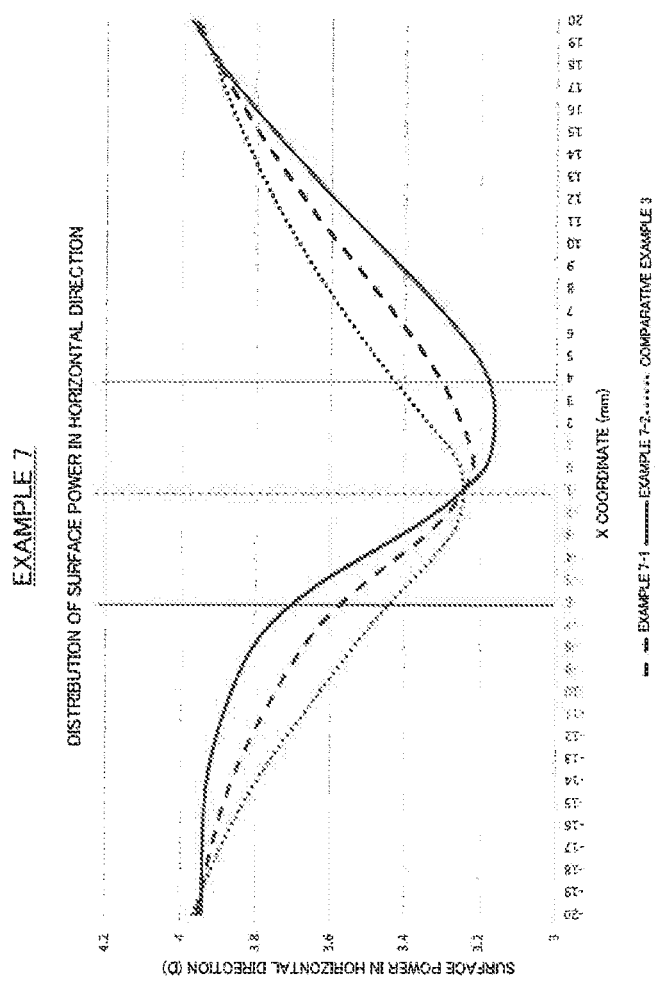
FIG. 33 is a graph for Example 7 and Comparative example 3, plotting a surface power in the horizontal direction on a line which is parallel with a horizontal reference line passing through two engraving marks imprinted in the spectacle lens in FIG. 3, and which passes through a mid-point of a line segment connecting a distance power measurement point and a near power measurement point.

As depicted in FIG. 27(*a*), which is a distribution map of the surface power in the horizontal direction, and FIG. 33 in which the surface power in the horizontal direction is plotted, the absolute value of the difference between the surface power values in the positions ±5 mm from the reference position through which the main line of sight passes, on a line which is parallel with the horizontal reference line passing through the two engraving marks and which passes through the mid-point of the line segment connecting the distance power measurement point and the near power measurement point, is 0.31 D in the case of Example 7-1 and 0.56 D in the case of Example 7-2, both exceeding the specified 0.12 D value. In this example, the position where the main line of sight passes is −1.25 mm in the X coordinate in FIG. 33.

Example 8

Figure 15:
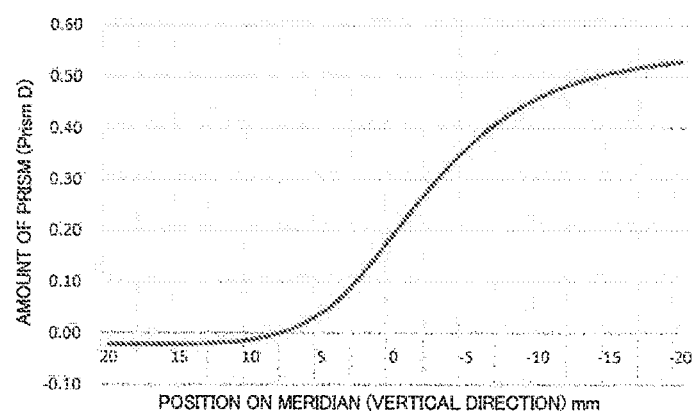
FIG. 15 is a graph depicting an amount of the prism added to the lens as a result of continuously twisting the inner surface of the lens in Example 8, where the abscissa indicates the vertical position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 6, but the aspect of continuously adding the base out prism is changed, as depicted in FIG. 15. In concrete terms, the base out prism is continuously added, starting from the distance power measurement point F. The amount of the base out prism at the near power measurement point N is 0.25Δ (Example 8-1) and 0.50Δ (Example 8-2). β (demagnification) in each example is the same as that of Example 3.

Figure 21:
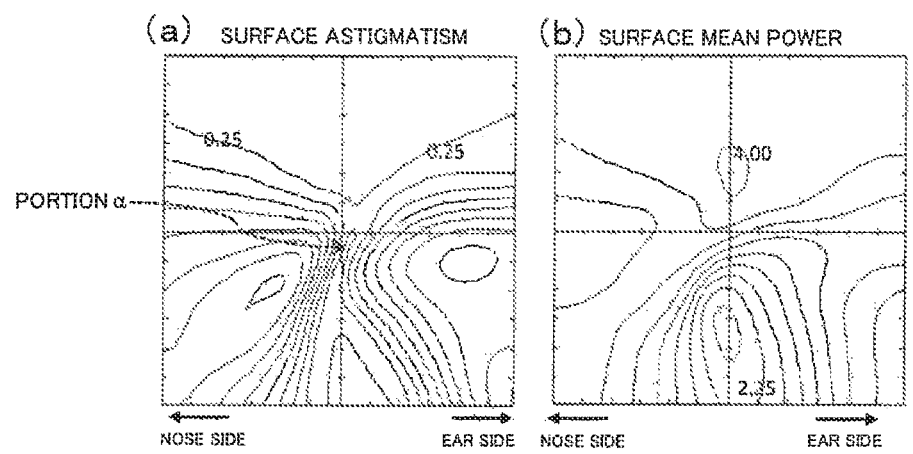
FIG. 21 is a set of diagrams of the spectacle lens according to Example 8, where

FIG. 21 (Example 8-2) depicts the design information acquired in this example. FIG. 21(*a*) is a distribution map of a surface astigmatism, and FIG. 21(*b*) is a distribution map of the surface mean power.

Figure 28:
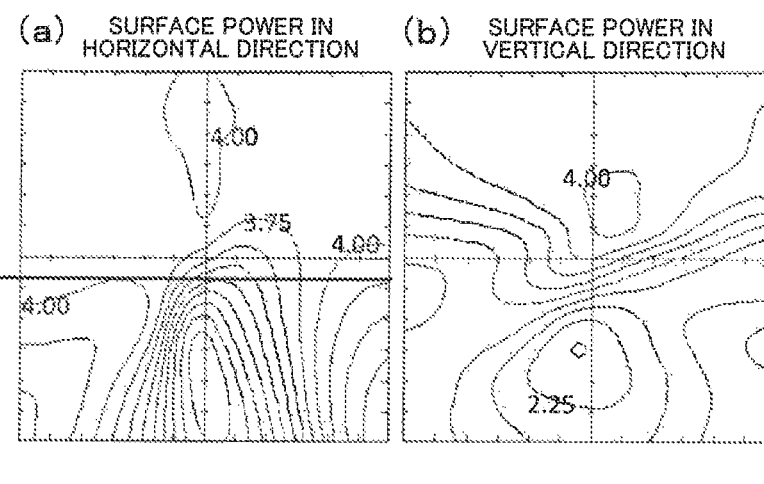
FIG. 28 is a set of diagrams depicting the distribution of a surface power according to Example 8, where
Figure 34:
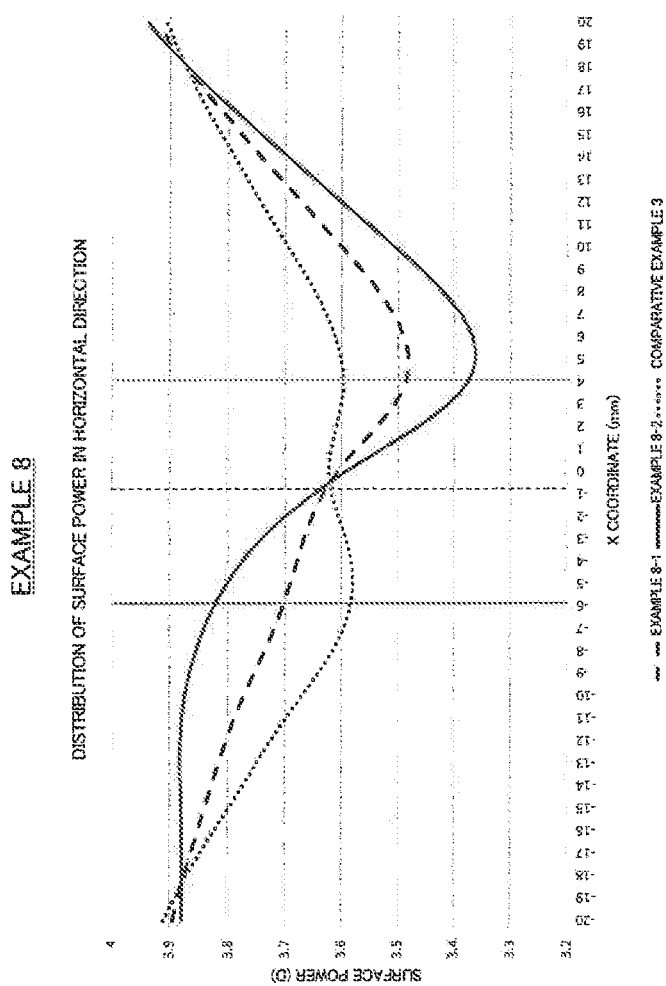
FIG. 34 is a graph for Example 8 and Comparative example 3, plotting a surface power in the horizontal direction on a line which is parallel with a horizontal reference line passing through two engraving marks imprinted in the spectacle lens in FIG. 3, and which passes through a point 3 mm higher in the vertical direction from a mid-point of a line segment connecting a distance power measurement point and a near power measurement point.

As depicted in FIG. 28(*a*) which is a distribution map of the surface power in the horizontal direction, and FIG. 34 in which the surface power in the horizontal direction is plotted, the absolute value of the difference between the surface power values in the positions ±5 mm from the reference position through which the main line of sight passes, on a line which is parallel with the horizontal reference line passing through the two engraving marks and which passes through a point that is 3 mm higher in the vertical direction from the mid-point of the line segment connecting the distance power measurement point and the near power measurement point, is 0.22 D in the case of Example 8-1 and 0.45 D in the case of Example 8-2, both exceeding the specified 0.12 D value. In this example, the position where the main line of sight passes is −0.90 mm in the X coordinate in FIG. 34.

Based on the results of Examples 6 to 8, the following can be stipulated.

A shape of continuously (gradually) twisting at least one of the shapes of the object side surface and the eyeball side surface of the spectacle lens in the horizontal sectional view of the portion α in the lower direction of the spectacle lens is provided to the portion α.

In this state, the absolute value of the difference between the surface power values in the horizontal direction in the positions ±5 mm from the point through which the main line of sight passes is 0.12 D or more, on a line which is parallel with the horizontal reference line passing through the two engraving marks of the spectacle lens and which passes through any point on the line segment between the distance power measurement point F and the near power measurement point N.

In addition to this, any point on the line segment connecting the distance power measurement point F and the near power measurement point N is located in a ±3 mm range in the vertical direction from the mid-point between the distance power measurement point F and the near power measurement point N.

As a result, according to this example, technology to reduce the discomfort due to the magnification when the user wears the spectacle lens can be provided, in addition to the various above mentioned effects.

REFERENCE SIGNS LIST

1 Supply system of (a pair of) spectacle lens (for binocular vision)
20 Optical store side terminal
21 Information storing unit
22 Transmitting/receiving unit
30 Design manufacturer side terminal
31 Receiving unit
32 Designing unit
321 Computing means
33 Determining unit
34 Transmitting unit
4 External server, cloud
5 Public line

The invention claimed is:
1. A pair of spectacles lenses for binocular vision, at least one of the pair of spectacles lenses comprising:
an inner horizontal direction of each of the spectacle lenses that is a direction toward a nose of a user who wears the spectacle lenses, and an outer horizontal direction of each of the spectacle lenses is a direction toward an ear of the user, when an upper direction of each of the spectacle lenses is a direction of top of the spectacle lens and a lower direction of each of the spectacle lenses is a direction of bottom of the spectacle lens while the user wears the spectacle lens, a specific distance portion for viewing an object at a specific distance, a near portion for viewing an object at a distance nearer than the specific distance, a progressive portion where power changes continuously between the distance portion and near portion, and wherein for at least one lens of the pair of spectacle lens, a shape of a base out prism is added in a part that is lower than at least one of: a specific distance power measurement point of the specific distance portion; a prism power measurement point; or a fitting point in the spectacle lens; such that a line of sight of the user viewing the object through the part is directed to a direction that is different from a direction of a line which connects the part and the object, and the spectacle lenses satisfy the following equation:

$$P_N - P_F > ADD*h/10$$

where $P_N - P_F$ denotes an amount of unintended base out prism, $P_F$ denotes an amount of measured prism at the specific distance power measurement point of the specific distance portion, $P_N$ denotes an amount of measured prism at a near power measurement point of the near portion, the amount of prism indicates a positive value in a case of a base out prism and a negative value in a case of a base in prism, ADD denotes an addition power (D), and h denotes an amount of inset in the spectacle lens, in which a positive direction is toward the nose and a negative direction is toward the ear when viewed from a vertical line connecting an upper vertex and a lower vertex of the spectacle lens.

2. The pair of spectacle lenses for binocular vision according to claim 1, wherein the shape of the base out prism is provided in at least a portion of the progressive portion.

3. The pair of spectacle lenses for binocular vision according to claim 1, wherein each of the spectacle lenses satisfies the following equation:

$$|P_N - P_F - ADD*h/10| \geq 0.25.$$

4. The pair of spectacle lenses for binocular vision according to claim 1, wherein:
the shape of the base out prism is formed by twisting in the lower direction of the spectacle lens at least one of an object side surface and an eyeball side surface of the spectacle lens as viewed in a horizontal cross-sectional view of the progressive portion, so that the amount of the base out prism increases in the lower direction.

5. The pair of spectacle lenses for binocular vision according to claim 4, wherein an absolute value of a difference between surface power values in the vertical direction in positions ±15 mm from a point, through which a main line of sight passes, is 0.25 D or more, on a line which is parallel with a line passing through two engraving marks of the spectacle lens and which passes through any point on a line segment connecting the specific distance power measurement point and the near power measurement point.

6. The pair of spectacle lenses for binocular vision according to claim 5, wherein any point on the line segment connecting the specific distance power measurement point and the near power measurement point is located in a ±3 mm range in a perpendicular direction from a mid-point as reference between the specific distance power measurement point and the near power measurement point.

7. The pair of spectacle lenses for binocular vision according to claim 4, wherein the absolute value of a difference between surface power values in the horizontal direction in positions ±5 mm from a point, through which the main line of sight passes, is 0.12 D or more, on a line which is parallel with a line passing through two engraving marks of the spectacle lens and which passes through any point on a line segment connecting the specific distance power measurement point and the near power measurement point.

8. The pair of spectacle lenses for binocular vision according to claim 7, wherein any point on the line segment connecting the specific distance power measurement point and the near power measurement point is located in a ±3 mm range in the perpendicular direction from a mid-point as reference between the specific distance power measurement point and the near power measurement point.

9. The pair of spectacle lenses for binocular vision according to claim 1, wherein:
an absolute value of a difference between surface power values in the vertical direction in positions ±15 mm from a point, through which a main line of sight passes, is 0.25 D or more, on a line which is parallel with a line passing through two engraving marks of the spectacle lens and which passes through a point that is 3 mm higher in the vertical direction from a mid-point of a line segment connecting the specific distance power measurement point and the near power measurement point.

10. The pair of spectacle lenses for binocular vision according to claim 1, wherein an absolute value of a difference between surface power values in the vertical direction in positions ±15 mm from a point, through which the main line of sight passes, is 0.25 D or more, on a line which is parallel with a line passing through two engraving marks of the spectacle lens and which passes through a mid-point of a line segment connecting the specific distance power measurement point and the near power measurement point.

11. The pair of spectacle lenses for binocular vision according to claim 1, wherein:
an absolute value of a difference between surface power values in the vertical direction in ±15 positions mm from a point, through which the main line of sight passes, is 0.25 D or more, on a line which is parallel with a line passing through two engraving marks of the spectacle lens and which passes through a point that is 3 mm lower in the vertical direction from a mid-point of a line segment connecting the specific distance power measurement point and the near power measurement point.

12. The pair of spectacle lenses for binocular vision according to claim 1, wherein:
an absolute value of a difference between surface power values in the horizontal direction in positions ±5 mm from a point, through which the main line of sight passes, is 0.12 D or more, on a line which is parallel with a line passing through two engraving marks of the spectacle lens and which passes through a point that is 3 mm lower in the vertical direction from a mid-point of a line segment connecting the specific distance power measurement point and the near power measurement point.

13. The pair of spectacle lenses for binocular vision according to claim 1, wherein an absolute value of a difference between surface power values in the horizontal direction in positions ±5 mm from a point, through which the main line of sight passes, is 0.12 D or more, on a line which is parallel with a line passes through two engraving marks of the spectacle lens and which passes through a mid-point of a line segment connecting the specific distance power measurement point and the near power measurement point.

14. The pair of spectacle lenses for binocular vision according to claim 1, wherein:
  an upper direction of each of the spectacle lenses is a direction of a top of the spectacle lens and a lower direction of each of the spectacle lenses is a direction of a bottom of the spectacle lens while the user wears the spectacle lens, and
  an absolute value of a difference between surface power values in the horizontal direction in positions ±5 mm from a point, through which the main line of sight passes, is 0.12 D or more, on a line which is parallel with a line passing through two engraving marks of the spectacle lens and which passes through a point that is 3 mm higher in the vertical direction from a mid-point of a line segment connecting the specific distance power measurement point and the near power measurement point.

15. The pair of spectacle lenses for binocular vision according to claim 1, wherein an amount of the base out prism is 2 Δ or less.

16. A manufacturing method for at least one of a pair of spectacle lenses for binocular vision, the method comprising:
  an inner horizontal direction of each of the spectacle lenses is a direction toward a nose of a user who wears the spectacle lenses, and an outer horizontal direction of each of the spectacle lenses is a direction toward an ear of the user;
  when an upper direction of each of the spectacle lenses is a direction of top of the spectacle lens and a lower direction of each of the spectacle lenses is a direction of bottom of the spectacle lens while the user wears the spectacle lens;
  a designing step of designing the spectacles lenses for binocular vision to include:
    a specific distance portion for viewing an object at a specific distance,
    a near portion for viewing an object at a distance nearer than the specific distance,
    a progressive portion where power changes continuously between the distance portion and near portion, and
    wherein for at least one lens of the pair of spectacle lens, a shape of a base out prism is added in a part that is lower than at least one of: a specific distance power measurement point of the specific distance portion; a prism power measurement point; or a fitting point in the spectacle lens; such that a line of sight of the user viewing the object through the part is directed to a direction that is different from a direction of a line which connects the part and the object, and
    satisfying the following equation:

$P_N - P_F > ADD * h/10$ where $P_N - P_F$ denotes an amount of unintended base out prism, $P_F$ denotes an amount of measured prism at the specific distance power measurement point of the specific distance portion, $P_N$ denotes an amount of measured prism at a near power measurement point of the near portion, the amount of prism indicates a positive value in a case of a base out prism and a negative value in a case of a base in prism, ADD denotes an addition power (D), and h denotes an amount of inset in the spectacle lens, in which a positive direction is toward the nose and a negative direction is toward the ear when viewed from a vertical line connecting an upper vertex and a lower vertex of the spectacle lens; and
  a manufacturing step of manufacturing the pair of spectacle lenses for binocular vision based on the designing step.

17. A supply system for designing, manufacturing and supplying at least one of a pair of spectacle lenses for binocular vision, the system comprising:
  an inner horizontal direction of each of the spectacle lenses is a direction toward a nose of a user who wears the spectacle lenses, and an outer horizontal direction of each of the spectacle lenses is a direction toward an ear of the user;
  when an upper direction of each of the spectacle lenses is a direction of top of the spectacle lens and a lower direction of each of the spectacle lenses is a direction of bottom of the spectacle lens while the user wears the spectacle lens;
  a designing unit configured to design the spectacles lenses for binocular vision to include:
    a specific distance portion for viewing an object at a specific distance,
    a near portion for viewing an object at a distance nearer than the specific distance,
    a progressive portion where power changes continuously between the distance portion and near portion, and
    wherein for at least one lens of the pair of spectacle lens, a shape of a base out prism is added in a part that is lower than at least one of: a specific distance power measurement point of the specific distance portion; a prism power measurement point; or a fitting point in the spectacle lens; such that a line of sight of the user viewing the object through the part is directed to a direction that is different from a direction of a line which connects the part and the object, and
    satisfying the following equation:

$P_N - P_F > ADD * h/10$ where $P_N - P_F$ denotes an amount of unintended base out prism, $P_F$ denotes an amount of measured prism at the specific distance power measurement point of the specific distance portion, $P_N$ denotes an amount of measured prism at a near power measurement point of the near portion, the amount of prism indicates a positive value in a case of a base out prism and a negative value in a case of a base in prism, ADD denotes an addition power (D), and h denotes an amount of inset in the spectacle lens, in which a positive direction is toward the nose and a negative direction is toward the ear when viewed from a vertical line connecting an upper vertex and a lower vertex of the spectacle lens; and
  a manufacturing unit configured to manufacture the pair of spectacle lenses for binocular vision based on results of the designing unit.

18. A non-transitory computer-readable storage medium storing a supply program for designing, manufacturing and supplying at least one of a pair of spectacle lenses for binocular vision causing a computer to function as:
- an inner horizontal direction of each of the spectacle lenses is a direction toward a nose of a user who wears the spectacle lenses, and an outer horizontal direction of each of the spectacle lenses is a direction toward an ear of the user;
- when an upper direction of each of the spectacle lenses is a direction of top of the spectacle lens and a lower direction of each of the spectacle lenses is a direction of bottom of the spectacle lens while the user wears the spectacle lens;
- a designing unit configured to design the spectacles lenses for binocular vision to include:
  - a specific distance portion for viewing an object at a specific distance,
  - a near portion for viewing an object at a distance nearer than the specific distance,
  - a progressive portion where power changes continuously between the distance portion and near portion, and
  - wherein for at least one lens of the pair of spectacle lens, a shape of a base out prism is added in a part that is lower than at least one of: a specific distance power measurement point of the specific distance portion; a prism power measurement point; or a fitting point in the spectacle lens; such that a line of sight of the user viewing the object through the part is directed to a direction that is different from a direction of a line which connects the part and the object, and
- satisfying the following equation:

$$P_N - P_F > ADD * h / 10$$

where $P_N - P_F$ denotes an amount of unintended base out prism, $P_F$ denotes an amount of measured prism at the specific distance power measurement point of the specific distance portion, $P_N$ denotes an amount of measured prism at a near power measurement point of the near portion, the amount of prism indicates a positive value in a case of a base out prism and a negative value in a case of a base in prism, ADD denotes an addition power (D), and h denotes an amount of inset in the spectacle lens, in which a positive direction is toward the nose and a negative direction is toward the ear when viewed from a vertical line connecting an upper vertex and a lower vertex of the spectacle lens; and
- a manufacturing unit configured to manufacture the pair of spectacle lenses for binocular vision based on results of the designing unit.

19. The pair of spectacle lenses for binocular vision according to claim 1, wherein the shape of the base out prism is further provided on at least one side adjacent to at least a portion of the progressive portion.

20. The pair of spectacle lenses for binocular vision according to claim 1, wherein the shape of the base out prism provided in at least the portion of the progressive portion is formed to increase toward the lower direction of the spectacle lenses.

21. The pair of spectacle lenses for binocular vision according to claim 1, wherein the shape of the base out prism is also formed in portions in the outer horizontal direction and in the inner horizontal direction when viewed from the progressive portion of the spectacle lens.

22. The pair of spectacle lenses for binocular vision according to claim 19, wherein the amount of the shape of the base out prism provided on the at least one side adjacent to at least the portion of the progressive portion is smaller than the amount of the shape of the base out prism provided on at least the portion of the progressive portion.

* * * * *